(12) United States Patent
Cantarelli et al.

(10) Patent No.: US 8,988,209 B2
(45) Date of Patent: Mar. 24, 2015

(54) DEVICE FOR MONITORING A VEHICLE WHEEL

(75) Inventors: Domenico Cantarelli, Pecetto di Valenza (IT); Paolo Colombo, Alessandria (IT)

(73) Assignee: Eltek S.p.A., Casale Monferrato (Alessandria) (IT)

(*) Notice: Subject to any disclaimer, the term of this patent is extended or adjusted under 35 U.S.C. 154(b) by 174 days.

(21) Appl. No.: 13/514,844

(22) PCT Filed: Dec. 10, 2010

(86) PCT No.: PCT/IB2010/055735
§ 371 (c)(1),
(2), (4) Date: Jun. 8, 2012

(87) PCT Pub. No.: WO2011/070540
PCT Pub. Date: Jun. 16, 2011

(65) Prior Publication Data
US 2012/0235809 A1     Sep. 20, 2012

(30) Foreign Application Priority Data
Dec. 10, 2009   (IT) .............................. TO2009A0974

(51) Int. Cl.
*B60Q 1/00*      (2006.01)
*B60C 23/02*     (2006.01)
(Continued)

(52) U.S. Cl.
CPC ......... *B60C 23/0408* (2013.01); *B60C 23/0494* (2013.01); *B60C 23/0452* (2013.01)
USPC ........... 340/455; 340/451; 340/438; 340/447; 340/450; 340/442; 73/1.57; 73/1.71; 73/146.3; 73/146.4; 73/146.8

(58) Field of Classification Search
CPC ............................. B60C 23/0447; B60C 29/02
USPC .............. 340/611, 612, 614, 626, 425.5–490; 73/1.57, 1.71, 146–146.8
See application file for complete search history.

(56) References Cited

U.S. PATENT DOCUMENTS 3,831,161 A * 8/1974 Enabnit .......................... 340/507
5,211,782 A * 5/1993 Thelen ........................... 152/427
(Continued)

FOREIGN PATENT DOCUMENTS

DE     102006056470      5/2008
EP         1241028        9/2002
(Continued)

OTHER PUBLICATIONS

International Search Report for PCT/IB2010/055735 mailed Jun. 6, 2011.
(Continued)

*Primary Examiner* — Steven Lim
*Assistant Examiner* — Muhammad Adnan
(74) *Attorney, Agent, or Firm* — Nixon & Vanderhye PC

(57) ABSTRACT

A monitoring device (20) of a vehicle wheel (11) is configured for detecting and transmitting, by a wireless connection, information relating to at least one characteristic quantity of the status of the wheel (11), such as the inflating pressure of a tire thereof. The device (20) has a casing (21-22) housing a circuit (30) adapted to transmit said information, the casing (21-22) being designed for coupling to an end portion (3a) of electrically conductive body (3) of a tire valve (2) of the wheel (11). The casing (21-22) includes a casing body (21) integrating interconnection means (28, 29, 40) prearranged to obtain both an electric connection of the circuit (30) to the end portion (3a) of the electrically conductive body (3) of the valve (2; 2'; 2"), and a mechanical coupling of the casing (21-22) to the end portion (3a) of the electrically conductive body (3) of the valve (2; 2'; 2").

20 Claims, 20 Drawing Sheets

(51) Int. Cl.
　　*G01L 27/00*　　(2006.01)
　　*G01M 17/02*　　(2006.01)
　　*B60C 23/00*　　(2006.01)
　　*B60C 23/04*　　(2006.01)

(56) References Cited

U.S. PATENT DOCUMENTS

| | | | | |
|---|---|---|---|---|
| 5,844,131 | A * | 12/1998 | Gabelmann et al. | 73/146.8 |
| 7,059,178 | B2 * | 6/2006 | Fischer et al. | 73/147 |
| 7,086,412 | B2 * | 8/2006 | Uleski | 137/223 |
| 2002/0124637 | A1 * | 9/2002 | Saheki et al. | 73/146 |
| 2004/0011445 | A1 * | 1/2004 | Harm | 152/152.1 |
| 2004/0163456 | A1 * | 8/2004 | Saheki et al. | 73/146.8 |
| 2004/0206169 | A1 * | 10/2004 | Normann et al. | 73/146.2 |
| 2006/0071765 | A1 * | 4/2006 | Lin | 340/442 |
| 2006/0272402 | A1 * | 12/2006 | Yin et al. | 73/146.8 |
| 2006/0272758 | A1 * | 12/2006 | Yin et al. | 152/427 |
| 2008/0074251 | A1 * | 3/2008 | Marguet et al. | 340/447 |
| 2008/0127724 | A1 * | 6/2008 | Qiu et al. | 73/146.8 |
| 2009/0223570 | A1 * | 9/2009 | Yu | 137/223 |
| 2009/0229676 | A1 * | 9/2009 | Palaoro et al. | 137/227 |
| 2010/0038004 | A1 * | 2/2010 | Saadat | 152/427 |
| 2010/0102944 | A1 * | 4/2010 | Lynn | 340/448 |
| 2010/0207445 | A1 * | 8/2010 | Medley et al. | 301/5.24 |
| 2012/0017672 | A1 * | 1/2012 | Uh et al. | 73/146.8 |

FOREIGN PATENT DOCUMENTS

| | | |
|---|---|---|
| WO | WO 2010/053515 | 5/2010 |
| WO | WO 2010/075967 | 7/2010 |

OTHER PUBLICATIONS

Written Opinion of the International Searching Authority mailed Jun. 6, 2011.

* cited by examiner

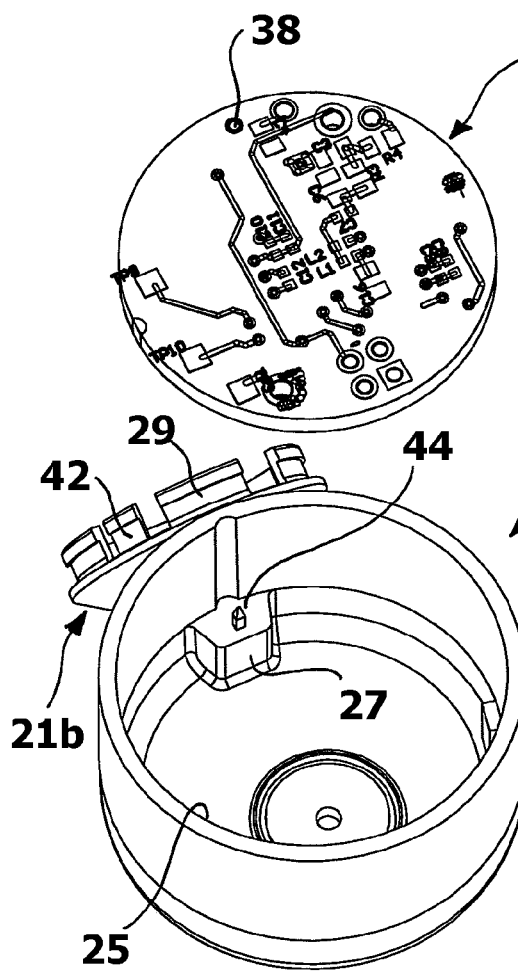
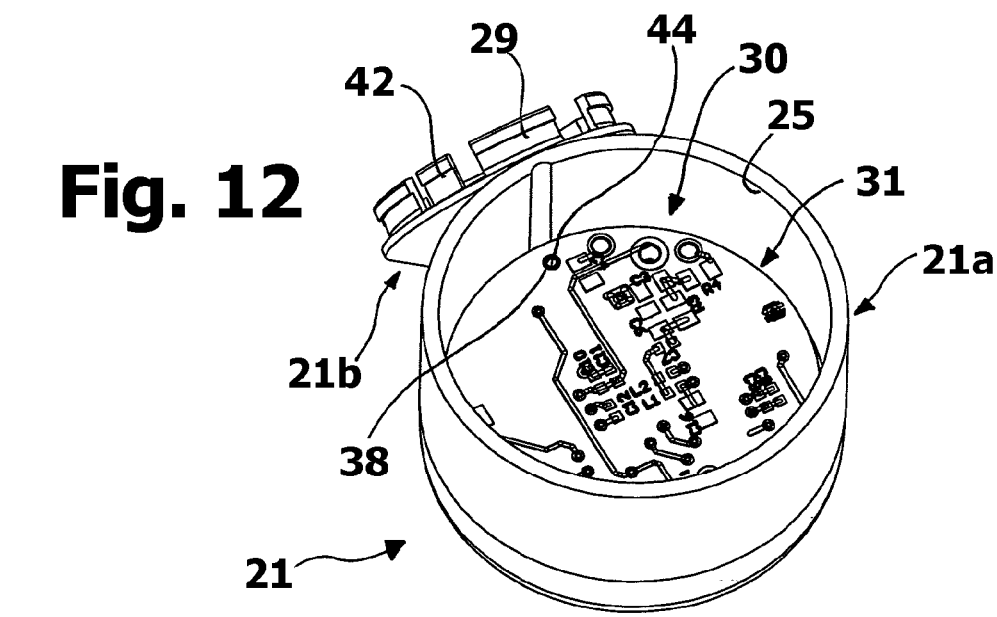

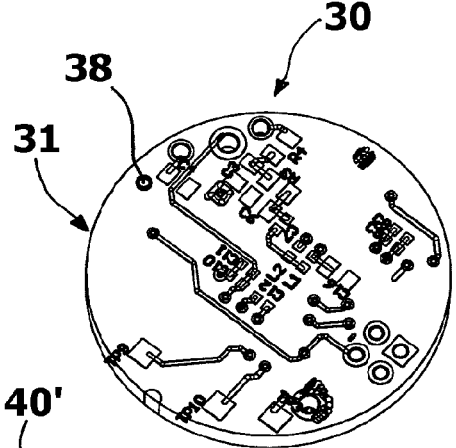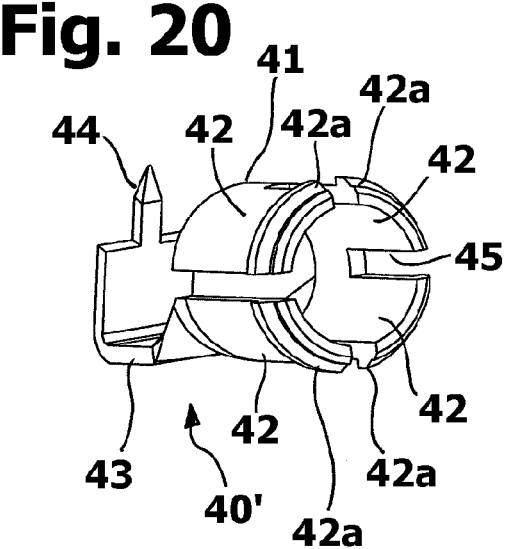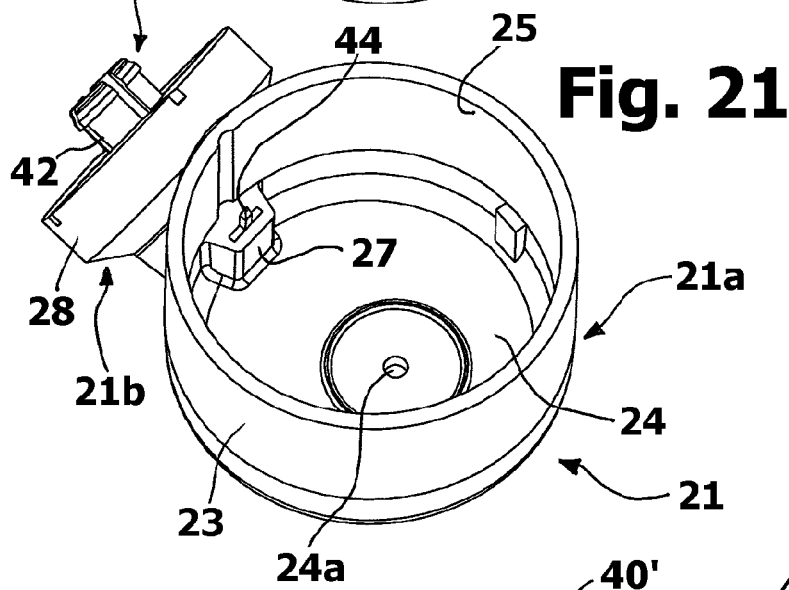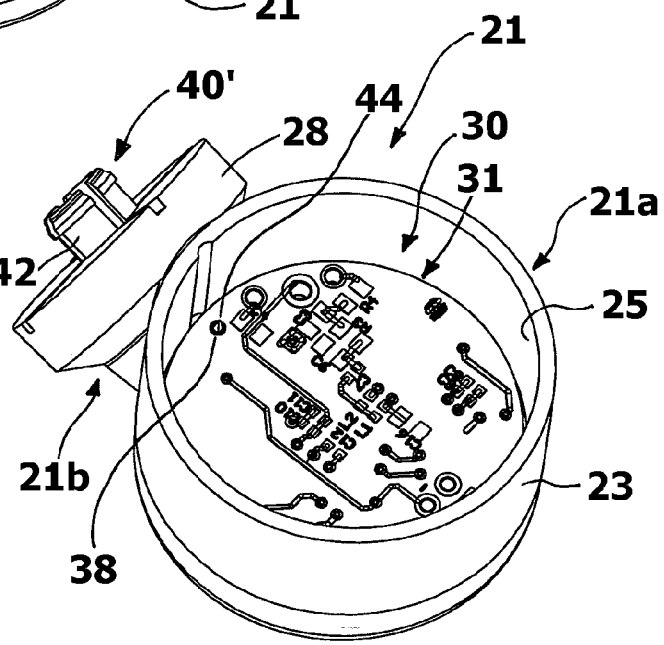
Fig. 20
Fig. 21
Fig. 22

Fig. 25
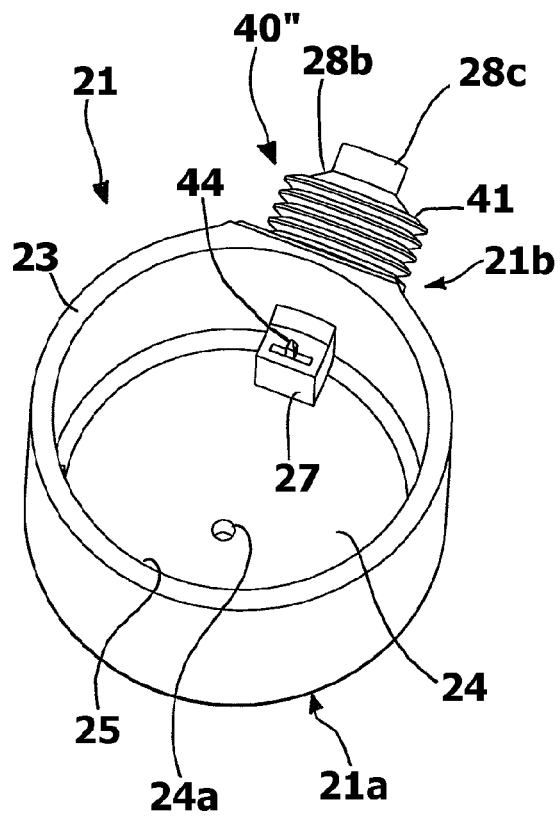
Fig. 26
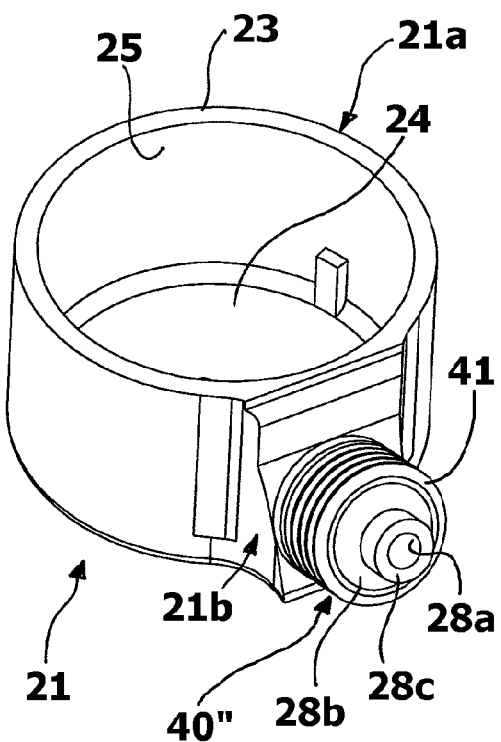
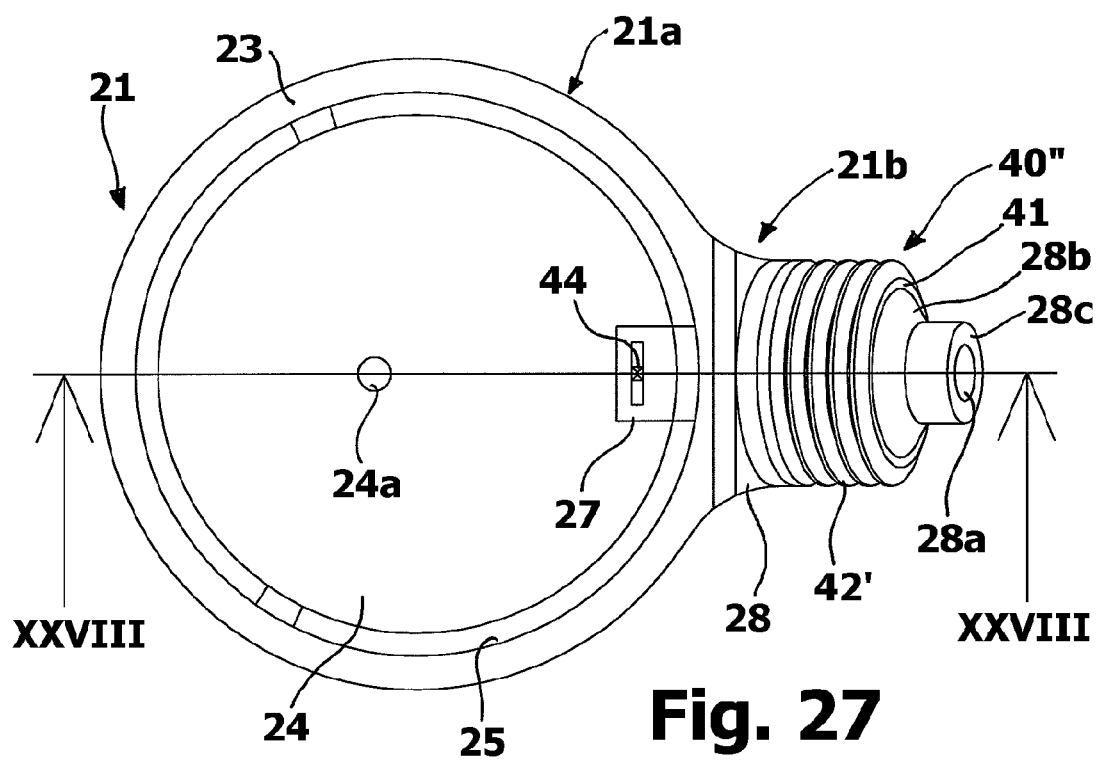
Fig. 27

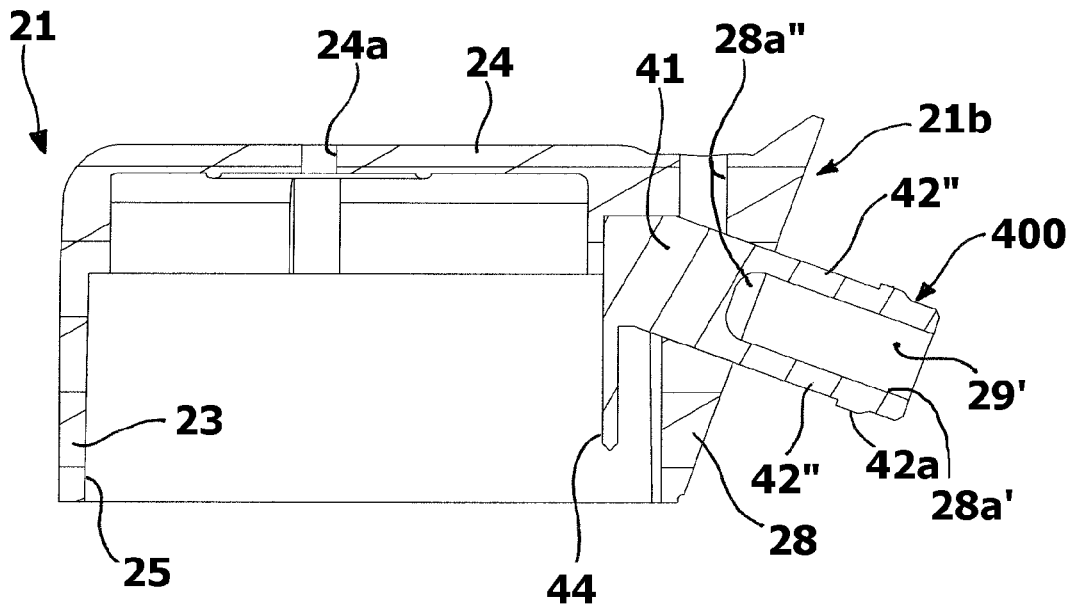
Fig. 33
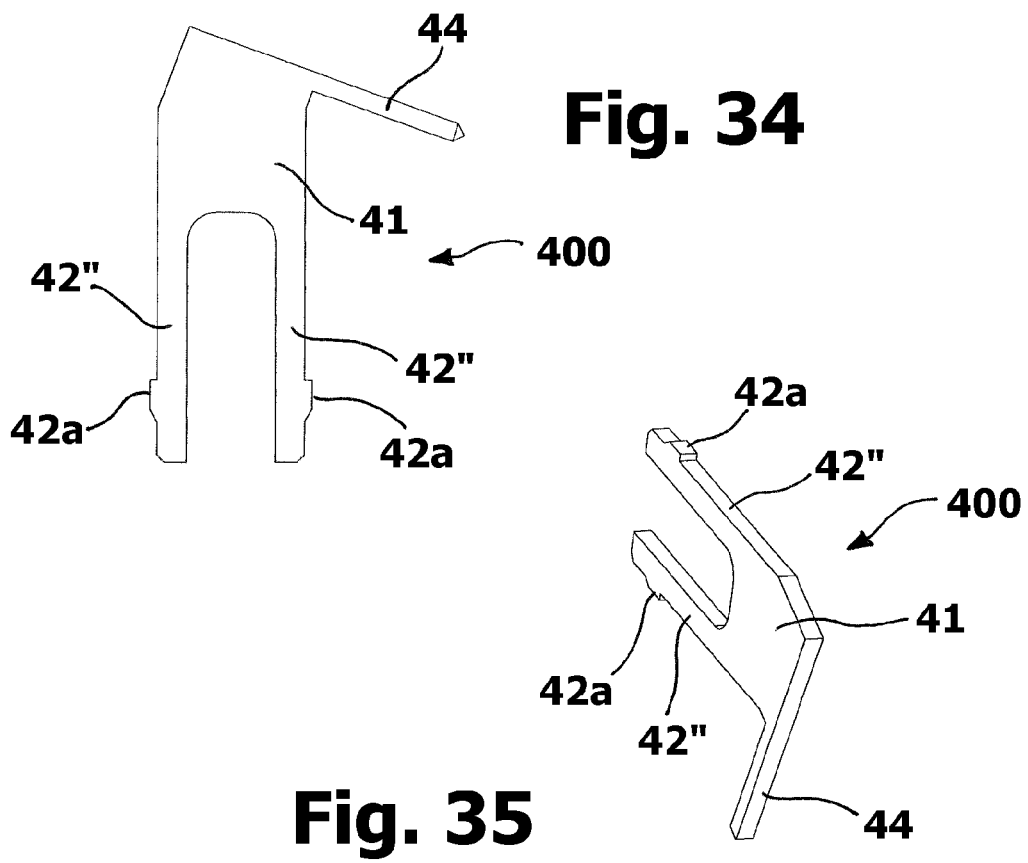
Fig. 34
Fig. 35

DEVICE FOR MONITORING A VEHICLE WHEEL

This application is the U.S. national phase of International Application No. PCT/IB2010/055735 filed. 10 Dec 2010 , which designated the U.S. and claims priority to IT TO2009A000974 filed 10 Dec. 2009, the entire contents of each of which are hereby incorporated by reference.

FIELD OF THE INVENTION

The present invention refers to devices for monitoring vehicle wheels. More particularly, the invention refers to devices adapted to detect one or more characteristic quantities which can be used for monitoring tyres, such as for example pressure thereof and transmit information indicating such quantity or quantities. Even more particularly, the invention regards one such device which is prearranged to be coupled to a valve, designed to be mounted on the wheel of the vehicle, and it is adapted to transmit—via radio—the abovementioned information to a receiver system, for example installed on the body of the vehicle or in the cabin thereof.

PRIOR ART

Devices for monitoring tyres of vehicle wheels are known and usually identified with the initials "TPMS" (standing for "Tyre Pressure Monitoring System"). Such devices usually comprise a circuit arrangement having a detection part, intended for detecting one or more quantities of interest, and a control part, intended for processing and transmitting signals. The detection part includes one or more sensors, for detecting one or more quantities to be monitored, usually represented by the inflating pressure and other possible quantities which may have an impact on the operating characteristics of the tyre, such as the ambient temperature, the temperature of the tyre, the conditions of the road surface (for example dry/wet). The electrical signals generated by sensor means are processed by the control part and transmitted from the latter to a receiver system arranged on the body of the vehicle or in the cabin thereof. The transmission of information from the monitoring device to the receiver system occurs in wireless mode, usually in radiofrequency.

In some TPMS devices the control circuit part is provided with its own source of power supply, comprising one or more miniaturized batteries. In other known TPMS devices the device is instead without batteries. For this purpose, in some solutions, the circuit part of the device is supplied by a piezo-electric generator, which exploits the vibrations in the tyre to generate a voltage. In other solutions, the device is instead of the "passive" type, i.e. it is prearranged in such a manner to react to a specific inductive electromagnetic field produced by a respective reader, providing—in response—a modulated radiofrequency representing data: thus, not having any internal source of power supply, these passive devices derive the power thereof from the same electromagnetic field generated by the reader.

In some solutions, the device is fixed to the rim bead, i.e. the annular part thereof which defines the channel for mounting the tyre. In this solution, the device is typically integrated or associated to a retention valve of the tyre, in the mounting channel of the rim (see for example US 2003/066343). In most solutions of this type, specifically referred to in the present invention, the device has a casing made of plastic material, which is coupled to a metal body of the valve. The tyre valves are however subjected to extremely high stresses (for example centrifugal accelerations up to 2000 g and strong vibrations coming from the road surface), and this may cause damages or breakage in the mechanical interface zone of the casing of the TPMS device with respect to the valve body. The risk of damage or breakage is increased by the fact that the casing of the TPMS device ends up constituting some sort of extension of the valve, and however a mass applied to the inner end of the valve.

Furthermore, with this type of solution, there may arise the need of having to replace the valve of the tyre, for example due to the damaging of the valve, or in case of replacement of the tyre or the rim of the wheel. In other known solutions, in order to avoid having to replace the TPMS device, besides the valve, the coupling of the two components in question in a separable manner was proposed. In these cases, besides the previously described drawbacks, risks of damage or breakage of the interface zone of the plastic casing of the TPMS device with respect to the metal body of the valve may also occur during the dismounting of the device from a valve and the subsequent mounting thereof on a new valve.

The abovementioned problems are partly overcome in cases in which the plastic casing of the device is secured to body valve through additional components, such as screws, bolts, clips (see for example EP 1 241 028 A1). Though this solution allows increasing the robustness of the coupling on one hand, it complicates the operations of mounting/dismounting the device with respect to the valve on the other hand, even with the risk of losing one or more components.

DE 10 2006 056470 A1 discloses a valve arrangement comprising a valve body and a device for measuring the tire pressure, in which the measuring device is secured on the valve body against axial movement in a pulling direction away from the valve body by a securing element.

US 2006/272758 A1 discloses a tire pressure sensor assembly including a valve stem and a printed circuit board, wherein the circuit board is rigidly connected to the valve stem.

US 2006/272402 discloses a tire pressure sensor assembly that includes a battery and a printed circuit board. The tire pressure sensor assembly is adapted to be fastened to a valve stem via a metal terminal.

SUMMARY OF THE INVENTION

With reference to what has been outlined above, the present invention aims at providing a device of the indicated type having high operational reliability regarding a mechanical structure thereof and resistance against external stresses. A further object of the invention is that of providing such device having high operational reliability even regarding the transmission quality of the radio signals between the device and a relative receiving system. Another object of the invention is that of providing such device being easy and quick to mount. Another object of the invention is that of providing such device being simple and inexpensive to construct. Another object is that of indicating a tyre valve having an improved design with the aim of use in combination with a monitoring device according to the invention.

One or more of these objects can be attained, according to the invention, by a monitoring device having the characteristics of claim 1. Advantageous characteristics of the device are indicated in the sub-claims. The claims form an integral part of the technical disclosure provided herein in relation to the invention.

BRIEF DESCRIPTION OF THE DRAWINGS

Further objects, characteristics and advantages of the present invention shall be clear from the detailed description that follows and from the attached drawings, provided strictly by way of non-limiting example, wherein:

FIGS. 11 and 12 are two further perspective views of the part of the casing of FIGS. 6-9, with a circuit of the device;

FIGS. 19 and 20 are perspective views of the insert of the part of the casing of FIGS. 15-18;

FIGS. 21 and 22 are two further perspective views of the part of the casing of FIGS. 15-18, with a circuit of the device;

FIGS. 25, 26 and 27 are perspective views, from different angles, of a part of the casing of the device of FIG. 23;

FIG. 33 is a section according to line XXXIII-XXXIII of FIG. 32;

FIGS. 34 and 35 are perspective views of the insert of the part of the casing of FIG. 32;

DESCRIPTION OF PREFERRED EMBODIMENTS OF THE INVENTION

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner into one or more embodiments. References herein are used for facilitating the reader and thus they do not define the scope of protection or the range of the embodiments.

Figure 1:
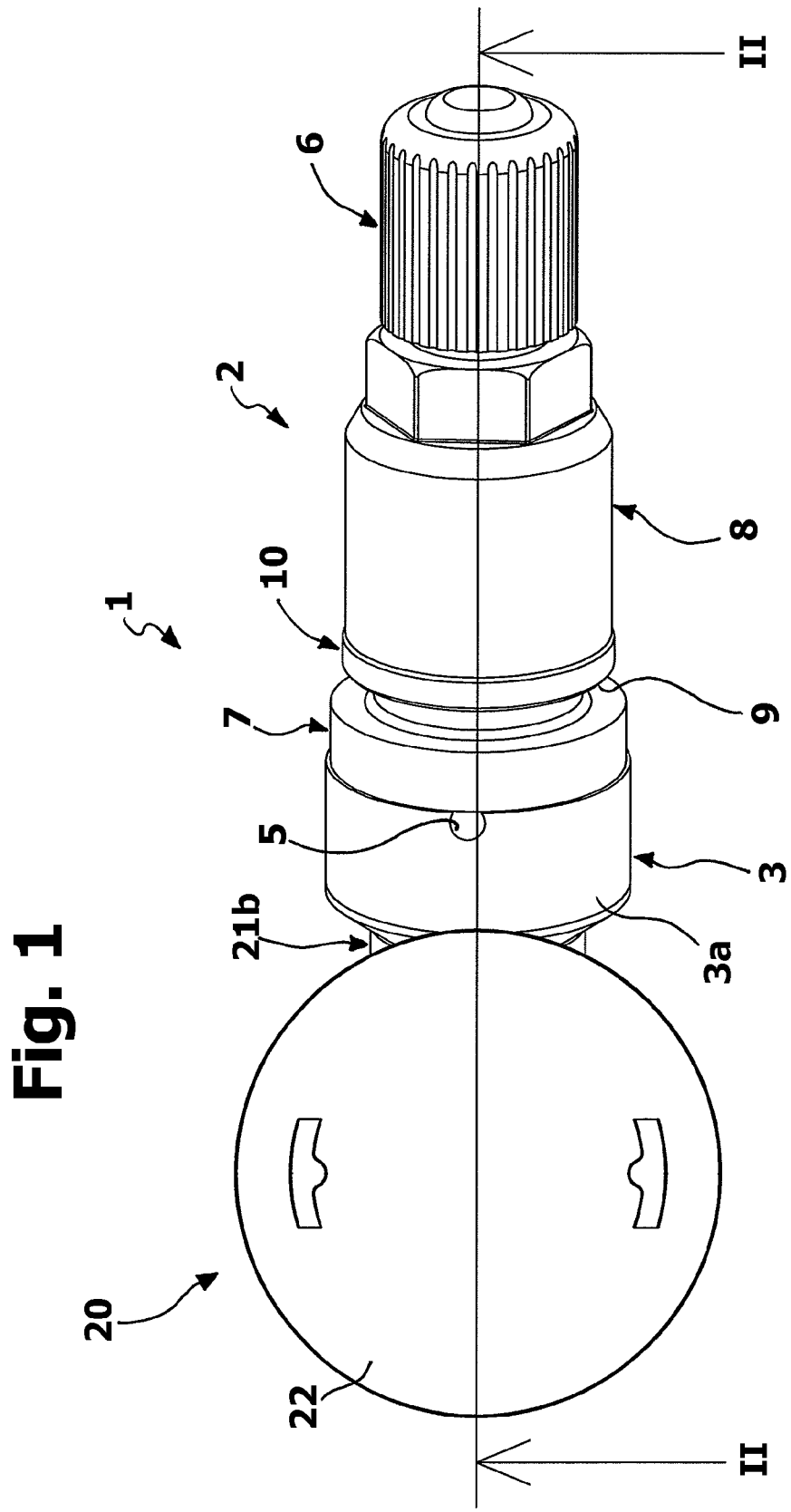
FIG. 1 is a schematic perspective view of a monitoring device according to a first embodiment of the invention, combined to a tyre valve of the first type.
Figure 2:
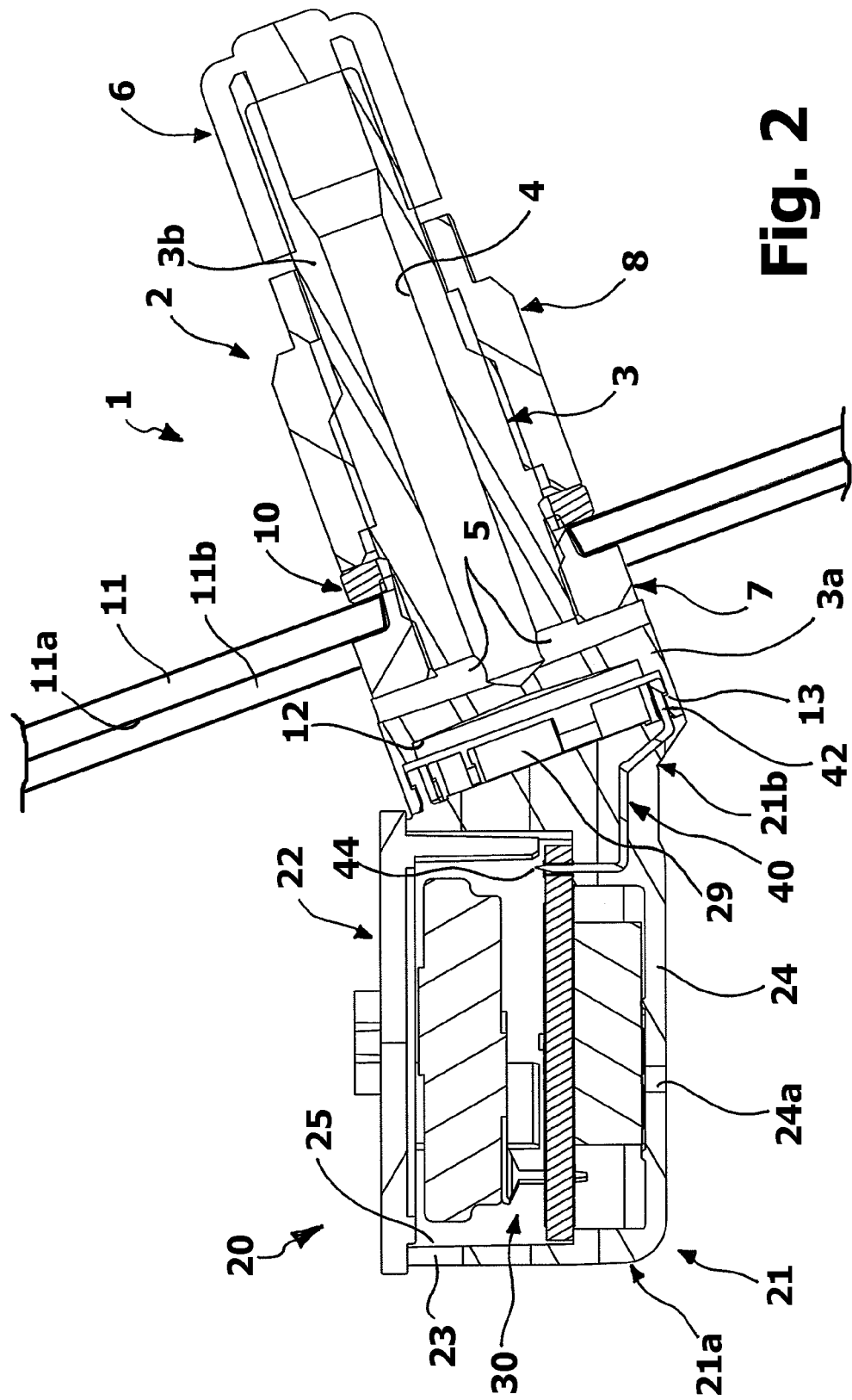
FIG. 2 is a section according to line II-II of FIG. 1.

A detection unit for a tyre of a vehicle wheel is indicated in its entirety with 1 in FIGS. 1 and 2. The unit 1 includes an air inflation/retention valve of the wheel, indicated in its entirety with 2, and a detection device, indicated in its entirety with 20, made according to a first embodiment of the present invention. Preferably, but not necessarily, the device 20 is configured to be coupled—in a separable manner—to the valve 2.

With particular reference to FIG. 2, the valve 2 comprises a main body 3 made of electrically conductive material, such as a metal, having a base or end part 3a and an axial part 3b, both generally cylindrical, the part 3a having a larger diameter with respect to the part 3b. In the example the body 3 is made in a single piece made of metal material, but non-represented in embodiments the body could be made of several assembled pieces and/or plastic material made electrically conductive.

The body 3 has an internal channel for the passage of air, comprising a conduit 4 axial to the part 3b which, in the part 3a, branches into a plurality of radial conduits 5. The end of the part 3b opposite to the part 3a is threaded externally, for the screwing of a cap 6 thereon; also the region of the part 3b proximal to the part 3a is threaded externally, for screwing thereon an annular-shaped spacer member, preferably made of synthetic and electrically insulating material, indicated with 7. The body 3 has an external threading also in the intermediate region of the part 3b, for screwing a mounting casing 8, axially hollow, made for example of plastic or metal material.

As observable, in the assembled condition of the previously indicated components of the valve 2, the member 7 and the casing 8 define—between them—an annular seat 9, at which a sealing ring or gasket 10, in particular made of electrically insulating synthetic material, is preferably provided for.

The valve 2 is intended to be mounted at a through hole of the rim bead of the wheel, schematically and partly represented only in FIG. 2, where it is indicated with 11. The mounting of the valve 2 is such that the part 3a of the body 3 and the member 7 are found in the rim 11, or in the mounting channel 11a of the tyre 11b, while the part 3b is mostly found outside the rim. For the purposes of mounting, the spacer member 7, as represented, is screwed on the main body 3 of the valve 2 and the unit thus formed is inserted into the abovementioned hole of the rim 11, from inside the mounting channel of the tyre, until the member 7 rests against the inner surface of the rim. The gasket 10, which rests against the outer surface of the rim 11 is then inserted into the part 3b, from outside the rim 11, and the casing 8 is subsequently screwed entirely: thus, the region of the rim 11 surrounding the mounting hole of the valve 2 is fastened between the member 7 and the gasket 10, at the seat 9, so as to keep the valve 2 in position. Obviously the diameter of the base part 3a of the body 3 and/or of the spacer member, as well as that of the gasket 10, is larger with respect to that of the hole present in the rim, so as to prevent the valve from being ejected during the use of the wheel.

The valve 2 further comprises inner components, not represented in that per se known, such as shutter means and a valve stem configured to obtain a retention valve and/or allow the unidirectional passage of the air in the conduit 4 and then in the conduits 5, towards the inside of the mounting channel of the tyre, for the inflation thereof.

Figure 3:
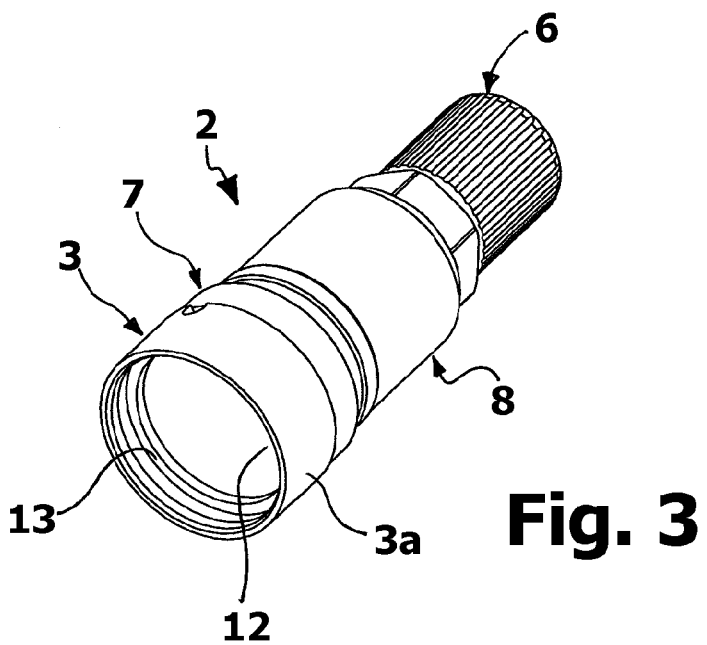
FIG. 3 is a schematic perspective view of the valve of FIG. 1.

The base part 3*a* of the body 3 is closed, at the end opposite to the cap 6, and a hooking seat, herein comprising a blind cavity 12, preferably cylindrical, observable in FIG. 3 is defined at such and. An engagement/hooking undercut or step, indicated with 13, is defined in the wall of the body part 3*a* which peripherally delimits the cavity 12: as observable hereinafter, such step 13 is used for connecting the device 20 to the body 3 of the valve 2.

Figure 4:
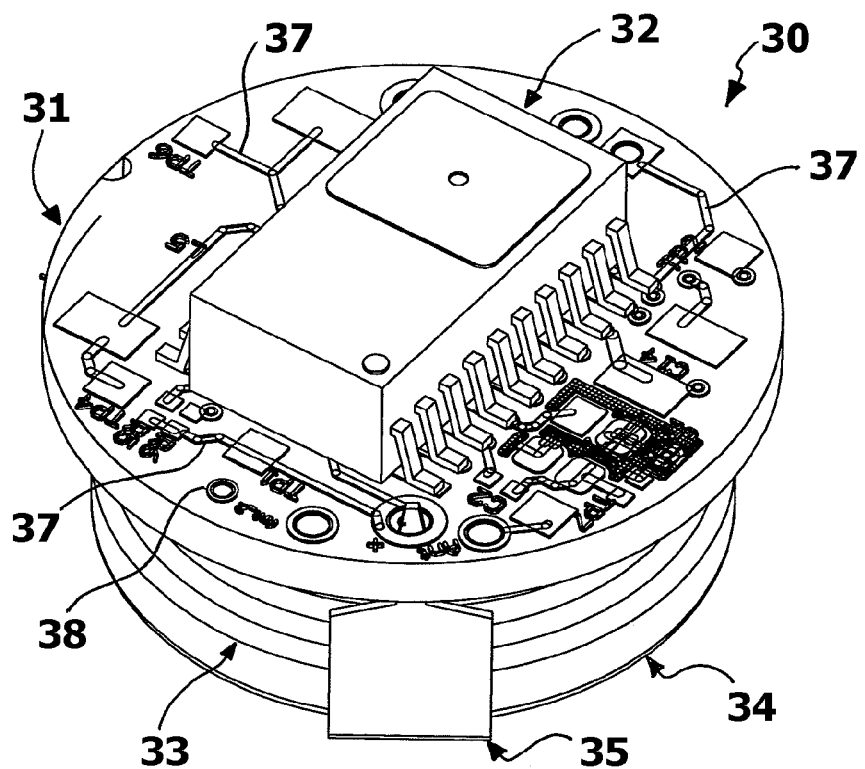
FIGS. 4 and 5 are schematic perspective views, from different angles, of a circuit example of the device according to the invention.
Figure 5:
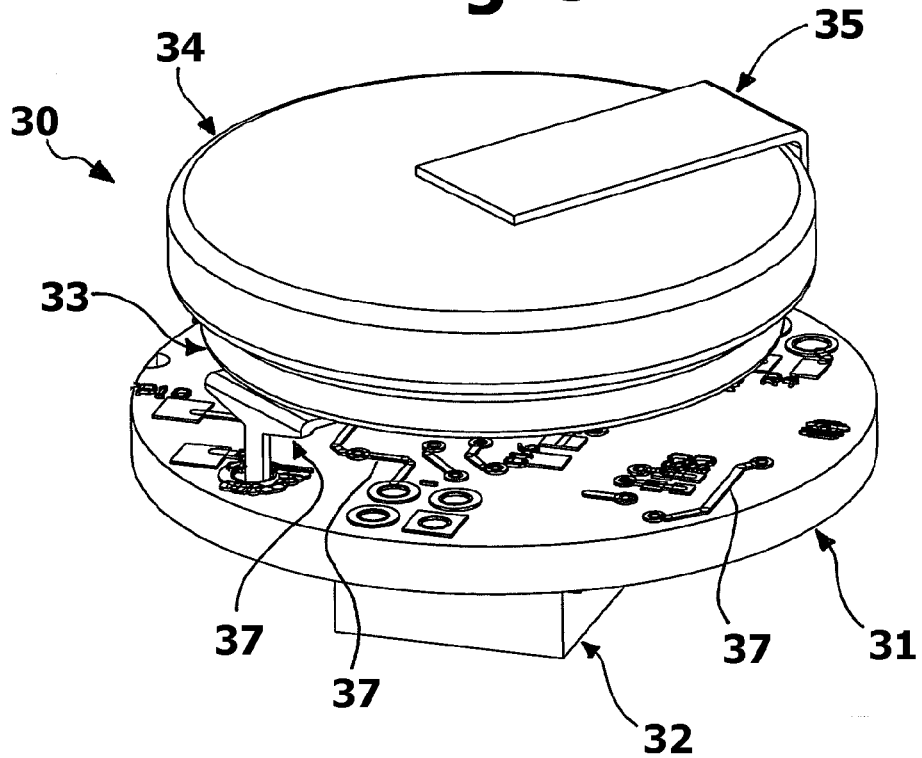
Figure 6:
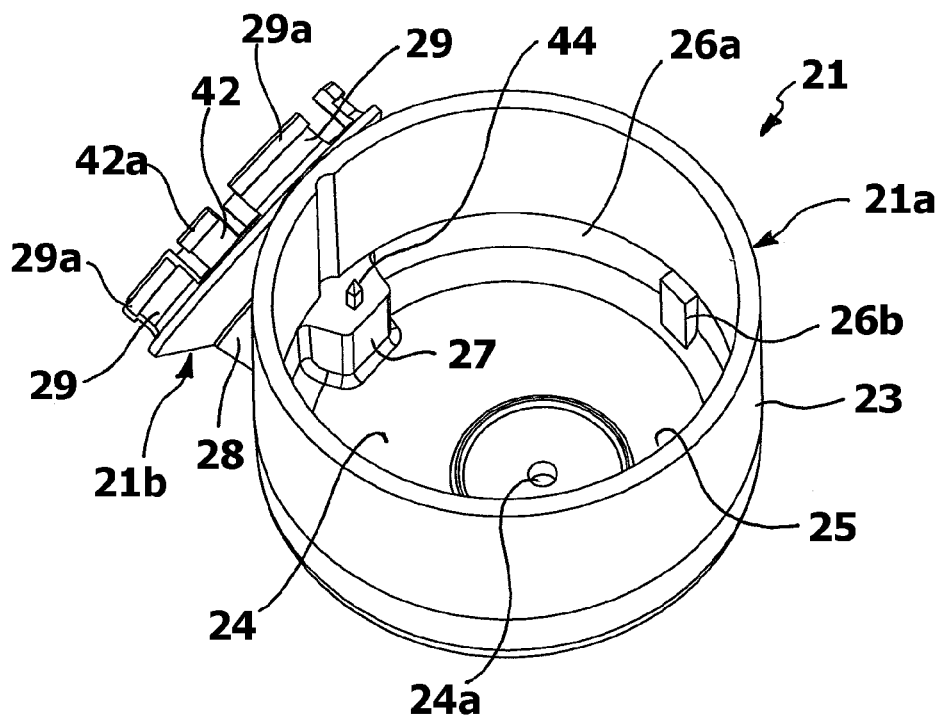
FIGS. 6, 7 and 8 are perspective views, from different angles, of a part of the casing of the device of FIG. 1.
Figure 7:
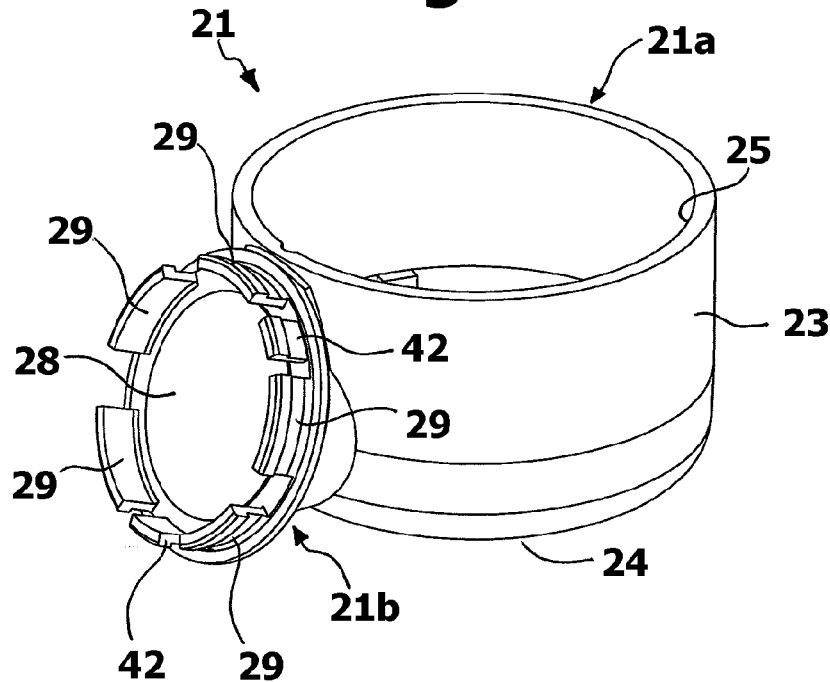
Figure 8:
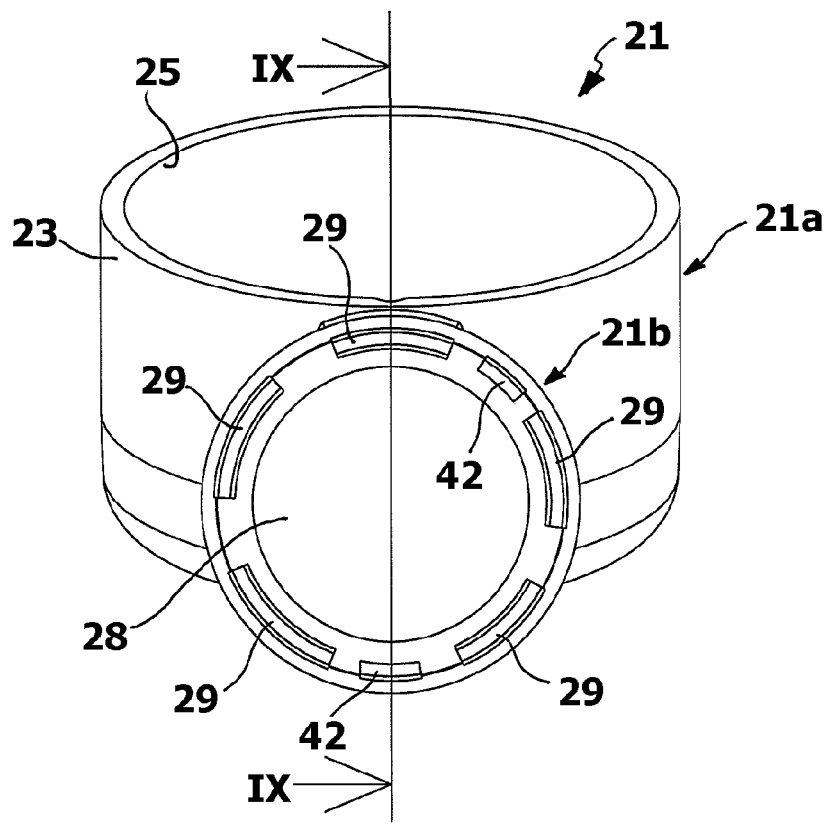
Figure 9:
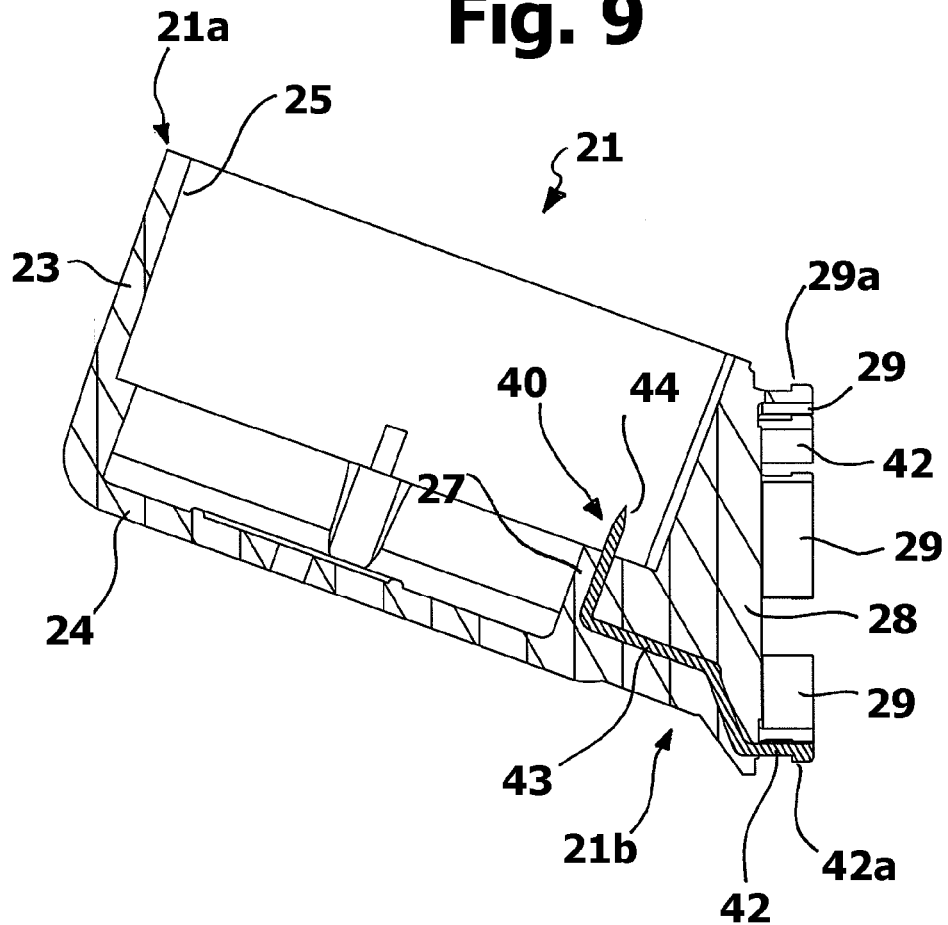
FIG. 9 is a section according to line IX-IX of FIG. 8.

In the exemplified embodiment, the device 20 has a casing comprising a main body 21 and a cover 22, which are mutually coupled for defining a housing for a circuit, indicated in its entirety with 30 in FIG. 2 and in FIGS. 4 and 5. The casing body 21 is mainly made using a relatively rigid mouldable plastic material, preferably in a single piece, and it has a housing portion and an interconnection portion. Also the cover 22 is preferably made using a mouldable plastic material, preferably relatively rigid.

With particular reference to FIGS. 6-9 and 11-12, the abovementioned housing portion of the body 21, indicated with 21*a*, is defined by a peripheral wall 23, preferably but not necessarily cylindrical, and by a bottom 24, in such a manner to define a cavity 25 in which the circuit 30 is positioned. Preferably, the body 21 is moulded or however configured in such a manner to define, in the cavity 25, seats or reliefs for positioning the circuit 30, such as a step 26*a* and/or axial reliefs 26*b*. The body 21 defines, in the cavity 25, also a solid formation 27, also useful for the further support and positioning of the circuit 30.

The interconnection portion of the body 21, indicated in FIGS. 6-9 and 11-12 with 21*b*, branches from the peripheral wall 23 in substantially radial direction, preferably slightly inclined, substantially at the region in which the formation 27 is defined.

According to the invention, the casing body 21 integrates interconnection means prearranged to obtain both an electric connection of the circuit 30 to the end portion 3*a* of the body 3 of the valve 2, and a mechanical coupling of the casing 21-22 to said end portion 3*a*. The feature according to which the body 21 integrates the above said interconnection means has to be meant in the sense that such means are integral, or made integral, with the housing body 21 of the device to form therewith one single body, which is separate and distinct with respect top the body of the valve 2 before coupling therewith, and wherein said single body is mechanically and electrically to the valve in a direct manner, without requiring loose" or additional components, such as screws, bolts, clips, typically provided for according to the prior art. As it will be clear hereinafter, in several embodiments, mechanical and electrical coupling can thus be obtained by a simple hooking, push-coupling or screwing of at least part of the interconnection means within a cavity or seat of the valve body, even without requiring special tools.

In the illustrated embodiment, the interconnection portion 21*b* is constituted by a solid portion 28 of the body 21, in which elastically deformable elastic hooking means, intended to provide a first mechanical coupling of the casing 21-22 to the valve 2 are provided for. In particular, in the illustrated embodiment, the material constituting the portion 28 defines at least part of said hooking means, such as a series of first elastically flexible fins 29, provided at the end of hooking elements or teeth 29*a*, preferably with a top including an inclined plane. In the illustrated embodiment, the fins 29 are arranged substantially according to a circumference, according to the shape of the cavity 12, with the hooking elements or teeth 29*a* comprising radial reliefs with respect to the circular shape of the cavity 12.

Figure 10:
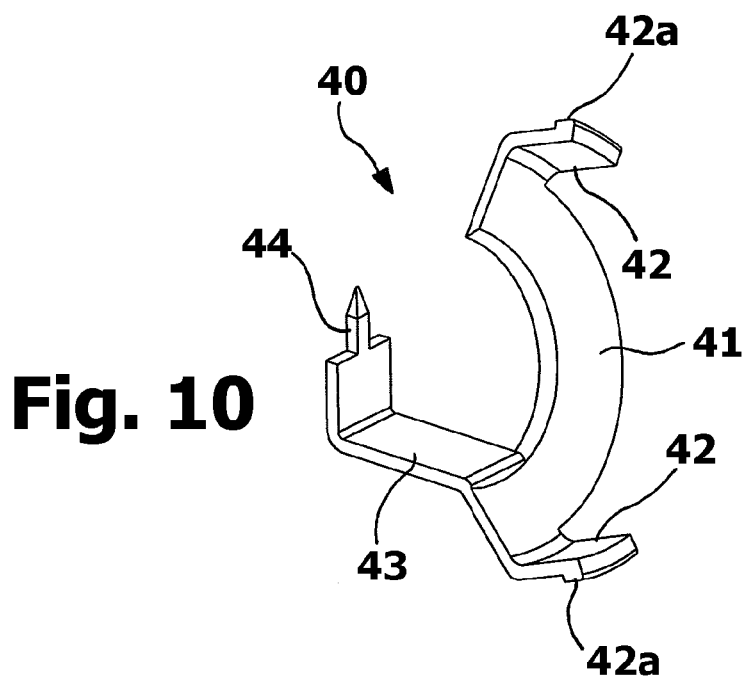
FIG. 10 is a perspective view of the insert of the part of the casing of FIGS. 6-9.
Figure 13:
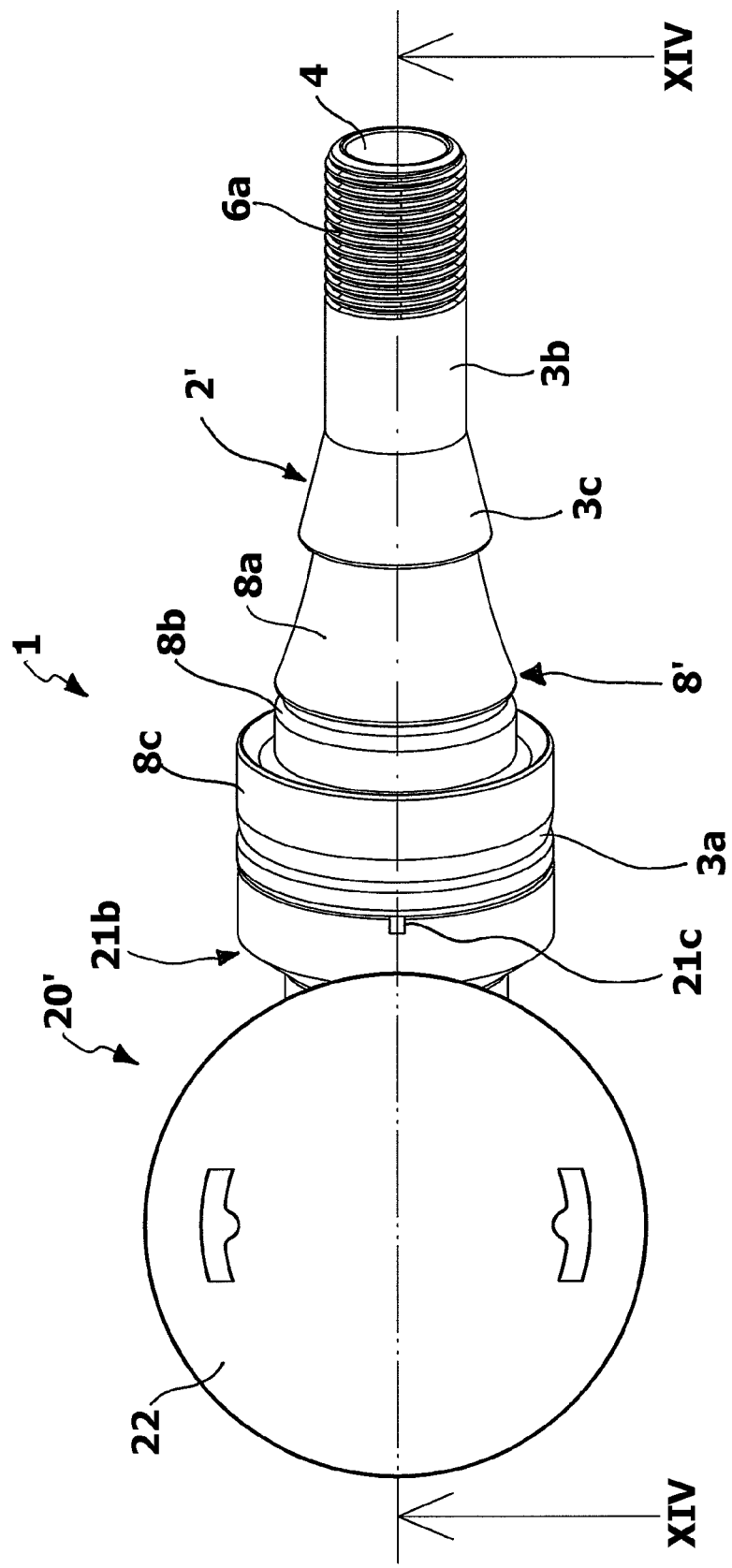
FIG. 13 is a schematic perspective view of a monitoring device according to a second embodiment of the invention, combined to a tyre valve of the second type.

The interconnection part 21*b* also includes an insert made of electrically conductive material, particularly a metal or a metal alloy or an electrically conductive plastic, which serves both the electrical interconnection functions and the mechanical interconnection functions with respect to the electrically conductive body 3 of the valve 2. The abovementioned insert, represented in FIG. 10, where it is indicated in its entirety with 40, defines mechanical coupling means and electrical connection means 44 protruding from the electrically insulating material of the casing body 21.

In the illustrated example, the insert 40 is obtained starting from a metal strip, for example made of copper or brass, cut and folded, preferably made of material adapted to be welded. As observable, in the example, the insert 40 has an arch-shaped base part 41, particularly circular-crown-shaped, from which flexible fins 42 rise orthogonally, in angular positions spaced from each other, shaped in such a manner to define respective end hooks or teeth 42*a*, preferably in form of radial reliefs, with top parts including an inclined plane. A portion 43 having at least one intermediate bend, with a generally narrow distal end, to form a preferably sharp pointed terminal 44, starts orthogonally from the part 41, in the opposite direction with respect to the fins 42. In this first embodiment, the fins 42 are intended to provide a second mechanical coupling of the casing 21-22 to the valve 2, together with the first mechanical coupling obtained through the fins 29.

The insert 40 is partially surrounded by, or embedded within, electrically insulating material of the casing body 21, and precisely in such a manner that the fins 42 project at least partly from the material constituting the portion 28 and at least the end zone of the terminal 44 projects from the material constituting the formation 27 of the cavity 25. For such purpose, the material constituting the body 21 may be conveniently moulded, preferably over-moulded or co-moulded with respect to the insert 40, through a method per se clear to a man skilled in the art.

As observable, for example in FIGS. 2, 6, 9 and 11, the end zone of the terminal 44 is located in the cavity 25 of the body 21, projecting upwards from the formation 27, preferably substantially perpendicular to the laying plane of the circuit support 31; on the other hand, as observable for example in FIGS. 2 and 6-9, the fins 42 of the insert 40 are located in the interconnection zone 21*b*, in a position corresponding to that of the fins 29 formed by the plastic material. More particularly it is observed how the fins 29 and 42 form—in their entirety—a hooking crown, where one or more fins 29 are preferably interposed between two fins 42. It should be observed that, in the practical embodiment of the invention, only one, or more than two or even all the fins of the interconnection part could be obtained through the insert 40, though the latter case is not strictly necessary for the purposes of the invention; in such case, for example the part 41 of the insert 40 could be circular-crown-shaped, with a plurality of fins 42 positioned along the entire circumference, at suitable angular distance from each other. Such embodiment of the insert could obviously be provided for even in cases where it is however intended to provide for in the interconnection portion 21*b* both plastic fins and metal fins (or fins constituted by conductive plastic elements), for example alternating with respect to each other.

FIGS. 4 and 5 schematically represent an example of a circuit 30. In the represented example, the circuit 30 comprises a circuit support 31, or PCB, made of insulating material, for example fibreglass, on which electrical and electronic circuit components are mounted; the specific circuit arrangement shall not be described in detail, the general functions thereof being obtainable in a per se known manner. In a preferred embodiment, a pressure sensor 32, particularly a sensor of the absolute type, preferably made of semiconductor material is mounted on the circuit support 31. It should be observed that, in order to allow the detection of the pressure by the sensor 32, the bottom 24 of the casing body 21 is provided with a through hole, indicated with 24a for example in FIGS. 2 and 6.

According to a per se know art, the circuit arrangement provided on the support 31 includes means for processing and/or conditioning the signal generated by the abovementioned sensor 32, as well as means for transmitting the respective pressure information in wireless means, particularly in radiofrequency, to a receiver system, not represented, also of the per se known type. The transmission means include an antenna, indicated with 33, essentially made up of a spiral-wound metal wire. It should be observed that, according to an embodiment, the device may also be prearranged for receiving data, for example configuration data, from an external transmitter: therefore, in such implementation, the circuit arrangement also comprises receiving means; the transmission and receiving means may also be conveniently formed by one single transceiver.

The circuit 30 further includes a source of power supply, represented by a button battery 34, as well as contact elements, indicated with 35 and 36, connected to the circuit arrangement mounted on the support 31, for power supply thereof.

It should be observed that in the present description, the term "circuit" and reference "30" indicate—in their entirety—the unit formed by the support 31 with the relative circuit components, the antenna 33, the battery 34 and the relative contact elements 35-36. In addition, it should be pointed out that, according to a possible alternative embodiment with respect to those represented, the circuit part of the device according to the invention may be of the type without battery and the relative contact elements, for example implemented according to the methods mentioned in the introduction of the present description, regarding TPMS devices of the type defined "passive" or provided with a power supply generator which exploits the vibrations of use of the tyre, typically a piezoelectric generator.

The circuit support 31 is provided with electrically conductive tracks, of the per se known type, some of which are indicated with 37. One of such conductive tracks, not shown in the figures, ends, at a respective end, at a hole, indicated with 38 in FIG. 4, made passing through in the support 31.

At such hole 38 the track in question is preferably configured to form a pad or ring or a bushing, so as to surround the hole or cover the surfaces that delimit it.

FIGS. 11 and 12 illustrate the type of mounting of the circuit 30 in the casing body 21; it should be observed that in such figures the representation of some components of the circuit 30 (such as the sensor 32, the antenna 33, the battery 34 and the contact element 35-36) were omitted for the sake of greater clarity. As observable from such figures, the support 31 is positioned in the cavity 25 of the body 21 in such a manner that the end of the terminal 44 is inserted in the hole 38, and thus electrically at contact with the conductive material of the relative track, which covers the surfaces of the abovementioned hole. The end of the terminal 44 may be possibly welded onto the conductive pad or bushing of the hole 38.

Once the circuit 30 has been mounted in the body 21, with the possible relative welding of the terminal 44, the casing of the device 20 is closed using the cover 22. In a preferred embodiment, the cover 22 is joined to the body 21 by welding, in particular a welding obtained by melting part of the material of the cover 22 and of the body 21, preferably by laser welding: this solution avoids the use of additional resins or sealants, and thus allowing reducing the overall weight of the device 20, as well as facilitating the relative assembly and/or improve the quality of the product.

The mechanical interconnection of the device 20 to the valve 2 occurs in a very simple manner. Actually, for such purpose, it is enough to push the casing 21-22 with respect to the valve 2, in such a manner that crown of fins 29 and 42 is inserted into the cavity 12 (FIGS. 2 and 3) of the base part 3a of the body 3 of the valve 2. The circumference defined by the teeth 29a and 42a of the fins 29 and 42 is slightly larger with respect to the circumference defined by the step 13; however, given that the fins 29 and 42 are elastically flexible, in the pushing step the fins may flex slightly inwards, in such a manner to allow the subsequent elastic return and engagement of the abovementioned teeth with the step or undercut 13. The engagement step is facilitated by the presence of inclined planes of the teeth 29a and 42a.

Thus, in such manner, the device 20 is mechanically hooked to the body 3 of the valve, through the fins 29 and 42. The fins 42, and thus the entire body of the insert 40, also allow establishing an electric continuity between the body 3 and the circuit 30. The valve 2, with the device 20 associated, may thus be mounted on the rim of the wheel, according to the methods described previously, with the device 20 being located in the mounting channel of the tyre.

It should be observed that, though a hooking crown obtained by means of fins was described previously, depending on the elastic and mechanic characteristics of the selected plastic, the number of fins may be different from the exemplified one (in an extreme case, described hereinafter in relation to a further embodiment of the invention, the hooking crown may be made in a single fin or cylindrical part interrupted only by one metal insert).

In the typical operation of the device 20 the sensor 32 generates an electric signal indicating the pressure and the circuit part provided for on the support 31, after possible processing, transmits it in radiofrequency towards the receiver system, not represented, in that it is of the known type and operates in a per se known manner. In the described embodiment the information generated and transmitted by the device 20 regard at least the inflating pressure of the tyre. In possible variants of the invention, additionally or alternatively to the detection of pressure, the device 20 may be configured for detecting and transmitting values indicating other quantities useful for monitoring the tyre, such as for example the temperature of the tyre, the stresses or vibrations during the movement, etcetera, also using sensors of the known type for such purpose.

In the application according to the invention, in order to improve the radiofrequency transmission of the signal generated by the device 20, from the inside of the wheel towards the outside, the device is prearranged to form a so-called monopole, with a configuration substantially of the type known as "Single Ground Stub". Such monopole is formed by the radial element constituted by the antenna 33 of the device 20 (which is present within the tyre) and by the metal or electrically conductive body 3 of the valve 2 which, as observed, mostly extends outside the tyre in the mounted condition. In the proposed application, the body 3 of the valve 2 plays an active role in the transmission of the signal, and in particular it constitutes the ground stub of the monopole, with the insert 40 providing a galvanic connection between said electronic circuit and the body valve 3. In order to adapt the impedance of the transmission stage to that of the antenna, the electronic circuit borne by the support 31 is preferably provided with an impedance adaptation network, connected to a conductive track which ends at the hole 38.

The insert 40, besides allowing the electrical connection between the body 3 of the valve 2 and the circuit 30, allows reinforcing the mechanical interface of the casing of the device 20, obtaining a metal core thereof. Furthermore, the fact that at least some of the hooking means between the device 20 and the body 3—i.e. the fins 42—are made of metal material makes the mechanical connection more safe and reliable. For the same reasons, the risks of damaging the interconnection zone 21b are reduced in the device 20 according to the invention. Another practical advantage of the proposed solution is that the device 20 does not require—for coupling to the valve thereof—"loose" or additional components, such as screws, bolts, clips, typically provided for according to the prior art, which could be lost during the first mounting of the device or when replacing a valve.

It shall be observed that, if possibly required, the separation of the device 20 and the body 3 of the valve 2 may be obtained in a simple manner, by means of suitable traction and/or inclining the casing 21-22 with respect to the body 3 of the valve, in such a manner to obtain a flexure of at least some of the fins 29, 42, or the disengagement of the respective teeth 29a, 42a from the step 13. The fins 29, 42 and/or the teeth 29a, 42a may be configured to prevent the abovementioned separation, simultaneously guaranteeing an easy coupling.

FIGS. 13-22 illustrate a second embodiment of the present invention; in such figures the same reference numbers of FIGS. 1-12 are used for indicating elements technically equivalent to those described previously.

In this second embodiment the device according to the invention, herein indicated in its entirety with 20', is combined to a valve of different type with respect to the first embodiment, and precisely a valve of the type commonly referred to as "snap-in", i.e. of the type adapted to be mounted on the rim of a wheel by means of a simple mechanical force (pressure or traction).

Also in this embodiment, the valve, indicated with 2', includes a body made of metal material 3, having a base part 3a and an axial part 3b, the latter having a thread 6a for a cap, not represented herein. In this embodiment, a mounting gasket made of elastically deformable material, such as an elastomer, indicated with 8', axially hollow, is fitted into the body 3 of the valve 2, and particularly into the part 3b thereof. As observable, particularly in FIGS. 13 and 14, the gasket 8' is constrained to the body 3 between the base part 3a and a shoulder 3c of the body 3. In the exemplified embodiment, the external profile of the gasket 8' has a generally conical portion 8a, a generally cylindrical intermediate portion 8b and an end portion 8c, also generally cylindrical, but having a larger diameter with respect to the portion 8b. It should also be observed that, in the illustrated example, the channel inside the valve 2' includes the conduit 4 alone, which axially traverses also the base part 3a of the body 3.

For mounting purposes, the valve 2' is forcedly inserted into the hole of the rim of the wheel, from within the mounting channel of the tyre, such hole having a larger diameter with respect to that of the abutment 3c. The valve 2' is forced until the cylindrical intermediate portion 8b is inserted into the abovementioned hole and the end portion 8c rests against the inner surface of the rim. The intermediate portion 8b has a larger diameter with respect to the hole but, given that the gasket 8' is made of elastically deformable material, the achievement of the abovementioned position allows efficiently withholding the valve 2', preferably through suitable shapes or seats. Obviously the diameter of the base part 3a of the body 3 and that of the end portion 8c of the body 8 are larger with respect to that of the hole present in the rim, and this prevents the valve 2' from being ejected during the use of the wheel.

Also the valve 2' comprises respective internal components, not represented, configured to allow the unidirectional passage and/or the interception of air in the conduit 4, inwards the mounting channel of the tyre, for inflation thereof.

In this valve 2', the end of the inner conduit 4 proximal to the base part 3a has a cylindrical widening, indicated with 12' in FIG. 2, which determines an undercut or step 13': as observable hereinafter, such step 13' is used for connecting the device 20' to the body 3 of the valve 2'.

The device 20' has a casing designed similar to that of the casing described with reference to the first embodiment, and thus comprising a main body 21 and a cover 22, which are mutually coupled to define a housing for a respective circuit 30. Also in this case, the casing body 21 is made using a relatively rigid mouldable plastic material, preferably in a single piece, and it has a housing portion 21a and an interconnection portion 21b. Also the cover 22 is preferably made using a mouldable plastic material, preferably relatively rigid. The cover 22 and the casing body 21 may be mutually sealingly fixed, preferably by means of welding.

Also in this case, the interconnection portion 21b of the body 21 is constituted by a solid portion 28 of the body 21, in which elastically deformable hooking means, obtained at least partly by a metal insert 40', having functions similar to those of the insert previously indicated with 40 are provided for.

Figure 19:
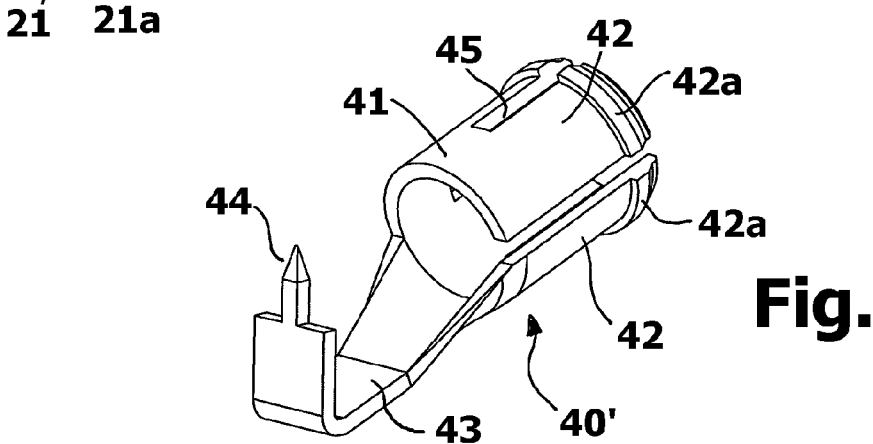
Figure 23:
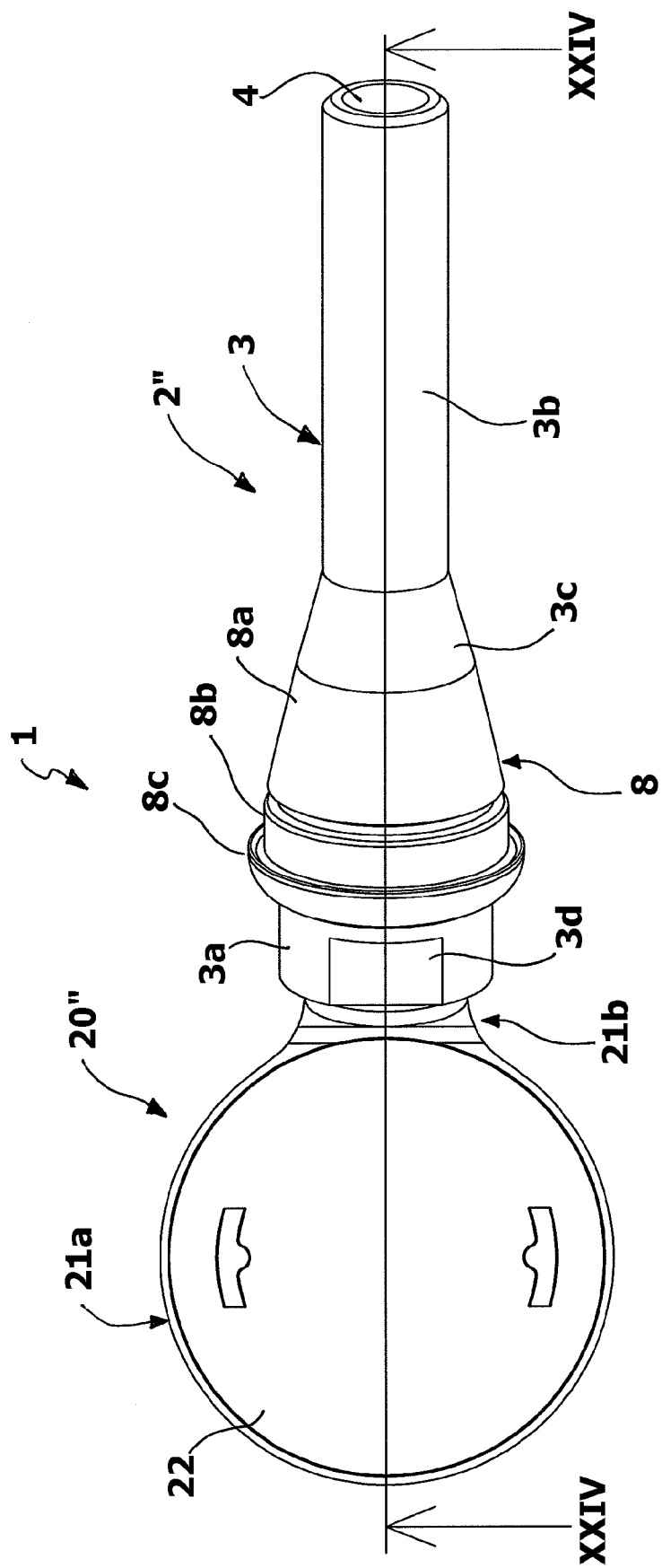
FIG. 23 is a schematic perspective view of a monitoring device according to a third embodiment of the invention, combined to a tyre valve of the third type.

The abovementioned insert is represented in FIGS. 19 and 20. Even in this case, the insert 40' may be obtained starting from a metal strip, for example made of copper or brass, cut and folded, preferably made of weldable metal material. In the example, the insert 40' has a base part 41 generally hollow cylindrical-shaped, from which flexible fins 42 rise, at angular positions spaced from each other, shaped in such a manner to define respective hooks or end teeth 42a, preferably with top parts including an inclined plane. As observable, even in this embodiment, the fins 42 each have a circumference arc-shaped transverse section, and define, in their entirety, a generally cylindrical or circular crown hooking portion. A portion 43 having at least one intermediate bend, with a generally narrow distal end, to form a generally sharp pointed terminal 44 branches, in the opposite direction with respect to the fins 42, from the cylindrical part 41.

Also in this embodiment, the insert 40' is partly embedded, in particular through over-moulding or co-moulding, in the material constituting the casing body 21, in such a manner that the fins 42 project at least partly from the material constituting the portion 28 and at least the end zone of the terminal 44 projects from the material constituting the formation 27 of the cavity 25, as observable for example in FIGS. 14, 15, 18, and 21; as evincible, in such manner the central passage of the base part 41 is occupied by the material constituting the body 21.

In this embodiment (just like in the subsequent one) the interconnection zone 21a is also prearranged to obtain a fluidic connection between the casing body 21 and the inner conduit 4 of the valve 2'.

The fins 42 of the insert 40' are situated in the interconnection zone 21b, protruding from the end face thereof and notches or radial grooves or, like in the illustrated examples, two rectilinear surface grooves, indicated with 21c, which intersect in the region surrounded by the fins 42 are provided for on such face. The cuttings which separate the fins 42 from each other (such cuttings are indicated with 45 in FIGS. 14 and 20) are aligned with grooves 21c: in such manner, when the device 20' is coupled to the valve 2', in the condition wherein it is mounted on the wheel, the abovementioned grooves 21c allow placing the axial conduit 4 of the valve in fluid communication with the internal of the mounting channel of the tyre, so as to allow the inflation of the latter.

It should be observed that, according to a possible variant, the insert 40' and the interconnection portion 21b may be configured in such a manner to provide for hooking fins also made of the material constituting the body 21, similarly to the first embodiment, or with fins made of plastic material interposed to metal fins of the insert.

In a further possible embodiment, not illustrated, at least one of the body 21 and the respective insert 40 or 40' is configured to define, additionally or alternatively to the fins 29 or 42 of the two embodiments described previously, external hooking fins, i.e. which engages outside (for example on the external diameter) the base part 3a of the body 3 of the valve, instead of inside the body 3, like in the first two represented embodiments. For such purpose, the base part 3a of the body of the valve may be provided outside with an engagement for the teeth of the abovementioned external fins In the case of the second embodiment, at least some of the mentioned external fins may be configured for engagement with the body of the gasket 8', by simply exploiting the elastic resilience of the latter, simultaneously guaranteeing an electric contact with the external surface of the part 3a of the body of the valve: thus, in this case the insert is prearranged for mechanically securing the casing 21-22 of the device indirectly, through the gasket.

FIGS. 21 and 22 illustrate the type of mounting of the circuit 30 in the casing body 21 of the device 20' according to the second embodiment, which is obtained through methods similar to those described previously with reference to FIGS. 11 and 12.

Also in this case, the mechanical and electrical interconnection of the device 20' to the valve 2' occurs in a very simple manner. As a matter of fact, for such purpose it is sufficient to push the device the device 20' in such a manner that the crown of fins 42 of the insert 40' is inserted inwards the axial conduit 4 of the body 3 of the valve 2', or it is hooked within a suitable seat 12' of the base part 3a. The circumference defined by the teeth 42a of the fins 42 is slightly larger with respect to the circumference of the end of the conduit 4; however, due to the presence of the inclined planes of the teeth 42a and given that the fins 42 are elastically flexible, in the step of pushing the fins they may flex slightly inwards, in such a manner to allow the subsequent engagement of the abovementioned teeth with the step or undercut 13', defined due to the cylindrical widening 12' of the conduit 4. Thus, in this manner the device 20' is mechanically hooked to the body 3 of the valve, with the insert 40' also allowing establishing an electric continuity between the body 3 and the circuit 30.

Also the separation of the device 20' and the body 3 of the valve 2', if possibly required, may be obtained in a simple manner, similarly to the first embodiment.

It shall be observed that the device 20' allows obtaining the same advantages outlined previously in relation to the first embodiment, with a further increased reinforcement of the mechanical interface of the casing body 21. The fact that, in this embodiment, the hooking means between the device 20' and the body 3—i.e. the fins 42—are all preferably made of metal material makes the mechanical and electrical connection even more safe and reliable and it reduces the risks of damaging the interconnection zone 21b, especially when the device 20' is to be reutilized.

FIGS. 23-30 illustrate a third embodiment of the present invention; in such figures the same reference numbers of FIGS. 1-22 are used for indicating elements technically equivalent to those described previously.

In this embodiment, the device according to the invention, herein indicated in its entirety with 20", is combined to a valve mounted in a manner similar to that of the second embodiment, i.e. to the "snap-in" type of valve.

Even in this embodiment, the valve, indicated with 2", includes a body made of metal material 3, having a base part 3a and an axial part 3b (the cap and the respective thread of the body 3 are not represented).

Even in this case, a mounting gasket 8' made of elastically deformable material, such as an elastomer, axially hollow, is fitted on the electrically conductive metal body 3 of the valve 2", similarly to the second embodiment. The mounting of the valve 2" occurs through methods similar to those described in relation to the second embodiment.

Also in this case the channel inside the valve 2" includes the conduit 4 alone, which axially traverses also the base part 3a. Furthermore, in this valve 2", the end portion of the conduit 4 which traverses the base part 3a has an internal thread or female thread, indicated with 13" in FIG. 24.

Also the valve 2" evidently comprises respective internal components, not represented, for allowing the unidirectional passage and/or the interception of air in the conduit 4, towards the internal of the mounting channel of the tyre, for inflation thereof.

The device 20" has a casing designed similarly to that of the casing described with reference to the previous embodiments, including the main body 21 and a cover 22, which are mutually coupled to define a housing for a respective circuit 30. Also in this case, the casing body 21 is made using a relatively rigid mouldable plastic material, preferably in a single piece, and it has a housing portion 21a and an interconnection portion 21b. Also the cover 22 is preferably made using a mouldable plastic material, preferably relatively rigid. The cover 22 and the casing body 21 may be mutually coupled or fixed sealingly, preferably by welding.

In this embodiment, the interconnection portion 21a of the body 21 is made up of a portion 28 of the body 21 which is traversed by a channel, described hereinafter; furthermore, in this case, instead of the elastically deformable hooking means, the interconnection portion 21b provides for screwing coupling means, obtained by a metal insert 40".

Figure 29:
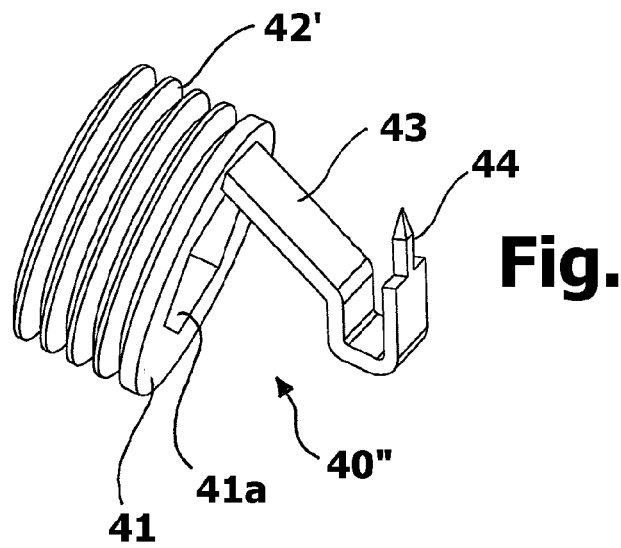
FIGS. 29 and 30 are perspective views of the insert of the part of the casing of FIGS. 25-27.
Figure 30:
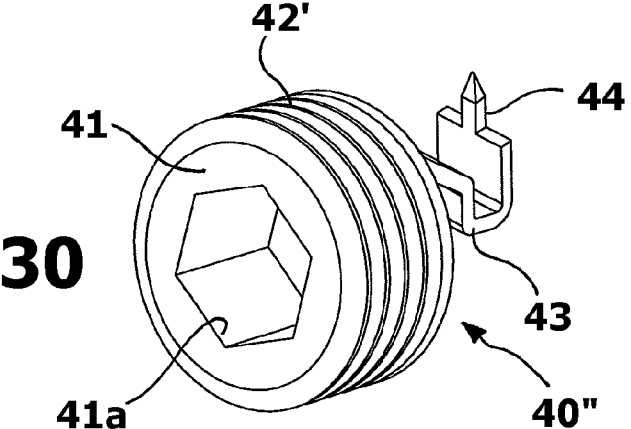

The abovementioned insert is represented in FIGS. 29 and 30. The insert 40" may be obtained through any method adapted for the purpose, for example through moulding and/or mechanical machining of metal, preferably of the weldable type, such as copper or brass. For example, the insert 40" may be moulded and then finished through mechanical machining, such as blanking and/or machining using machine tools, or entirely obtained through mechanical machining In the example, the metal insert 40" has a hollow cylindrical-shaped base part 41, externally provided with a thread 42', in such a manner to provide a threaded coupling element, adapted to be coupled by screwing to the corresponding threaded part 13" of the end portion 3a of the metal body 3 of the valve 2". The part 41 is axially traversed by a hole or passage 41a having a shaped traverse section, and however preferably not round; in the represented example, such section is hexagonal, but other shapes are also evidently possible, comprising an elliptical shape. A portion 43 provided with bends, with a generally narrow distal end, branches from the cylindrical part 41, to form a generally sharp pointed terminal 44. The metal portion 43 may also be provided for separately and then coupled or welded to the cylindrical part 41.

Figure 24:
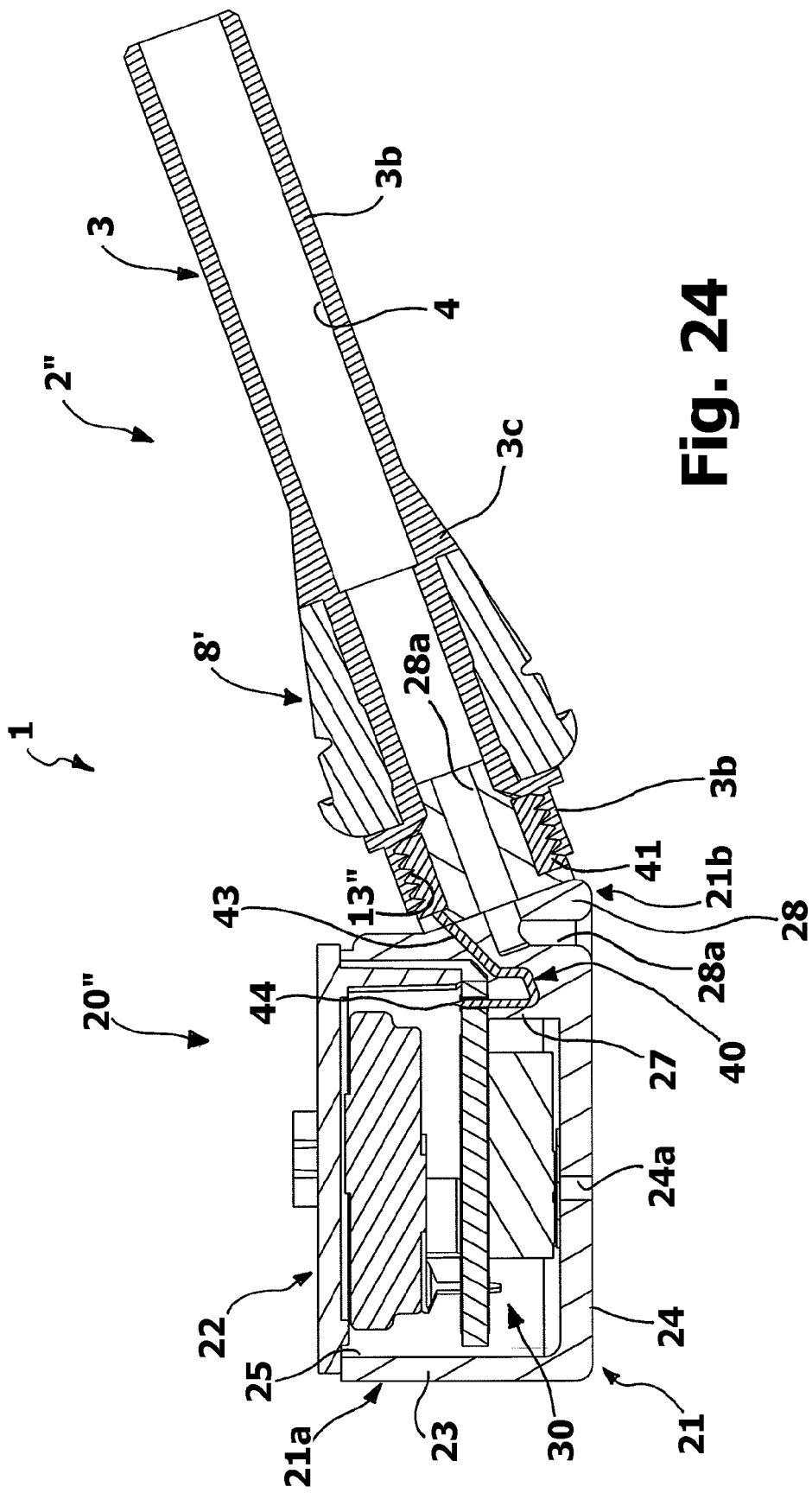
FIG. 24 is a section according to line XXIV-XXIV of FIG. 23.
Figure 28:
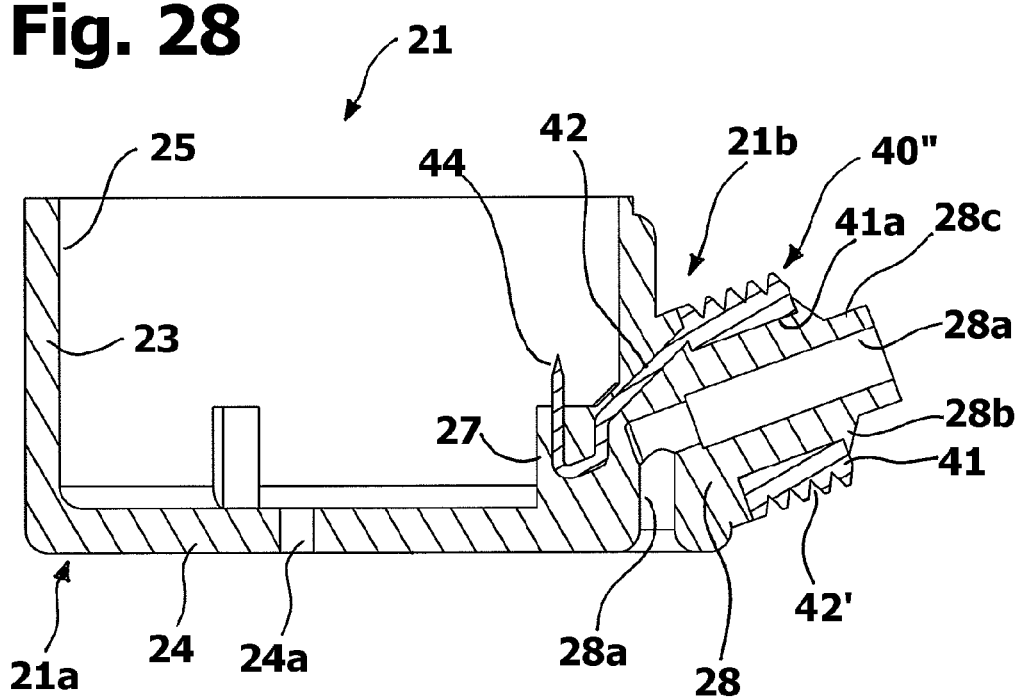
FIG. 28 is a section according to line XXVIII-XXVIII of FIG. 27.

Also in this embodiment, the insert 40" is partly embedded in the material constituting the casing body 21, in such a manner that the threaded part 41 projects from the material constituting the portion 28 and at least the end zone of the terminal 44 projects from the material constituting the formation 27 of the cavity 25, as observable for example from FIGS. 24, 25 and 28.

In this embodiment, part of the material that provides the interconnection portion 21b extends also through the cylindrical part 41 of the insert 40", or in the through hole 41a thereof. Furthermore, as mentioned, a channel, designed to be connected to the conduit 4 inside the valve 2" is defined in the portion 28, to allow inflating the tyre As evincible, particularly from FIG. 28, during the co-moulding of the casing body 21 onto the threaded insert 40", the plastic material may traverse the insert 40", due to the presence of the hole 41a; the fact that such hole 41a has a non-round section prevents the risk of mutual rotation between the insert and the casing body, particularly during the screwing of the device 20" onto the valve 2". It should be observed that the insert 40", or the cylindrical base part 41 thereof, is held in position at both ends, by the material constituting the interconnection portion 21b.

FIG. 28 also shows the channel formed in the body 21, i.e. passing through in the portion 28 thereof, indicated in its entirety with 28a, which is defined in part in the plastic material which is present within the hole 41a of the insert 40"; such channel 28a, in the illustrated example, ends on the face of the body 21 corresponding to the bottom wall 24, in which the hole 24a is also present.

In the illustrated embodiment a part of the plastic material of the portion 28 extends beyond the insert 40" and it is preferably configured to facilitate the fluidic coupling with the conduit 4 inside the valve 2"; also the portion 3a of the body of the valve 3 may be conveniently configured for such purpose, for example providing for—therein—a seat or shape having profile substantially complementary to that of the abovementioned part made of plastic material. In the example, the abovementioned material part is configured for defining a flange 28b, generally frusto-conical-shaped, from which a cylindrical section 28c branches, the flange and cylindrical section both being traversed by the channel 28a. The flange 28b, besides holding the insert 40" in position, facilitates the introduction of the section 28c into the conduit 4 of the valve 2" (also see FIG. 24). Obviously, the shape of the abovementioned material part of the portion 28 and of the part of the body 3 of the valve cooperating therewith may have a different shape with respect to that illustrated by way of example, without prejudice to the fact that, preferably, the two parts in question shall have a shape at least partly complementary, for facilitating accurate coupling.

The type of mounting of the circuit 30 in the casing body 21 of the device 20" according to the third embodiment is obtained through methods similar to those described previously with reference to the first two embodiments.

Also in this case, the mechanical and electric interconnection of the device 20" to the valve 2" occurs in a very simple manner. As a matter of fact, for such purpose it is enough to screw the threaded part 41 of the insert 40" into the female thread 13" formed at the end of the axial conduit of the body 3 of the valve 2". In order to facilitate this operation, two opposite flattenings, one of which is indicated with 3d in FIG. 23, which allow holding the valve firm by means of a simple wrench during the screwing (or unscrewing) of the device 20", or vice versa are obtained on the base part 3a of the body 3 of the valve 2". Thus, the device 20" is mechanically coupled to the metal body 3 of the valve 2", with the insert 40" which also allows establishing an electric continuity between the body 3 and the circuit 30; furthermore, the conduit 4 of the valve 2" is in fluid communication with the channel 28a formed in the interconnection portion 21b following such coupling.

It shall be observed that the separation of the device 20" and the body 3 of the valve 2" may be obtained in a simple manner, by unscrewing the casing 21-22 with respect to the body 3. It shall also be observed that the device 20" allows obtaining the same advantages described previously in relation to the second embodiment.

Figure 31:
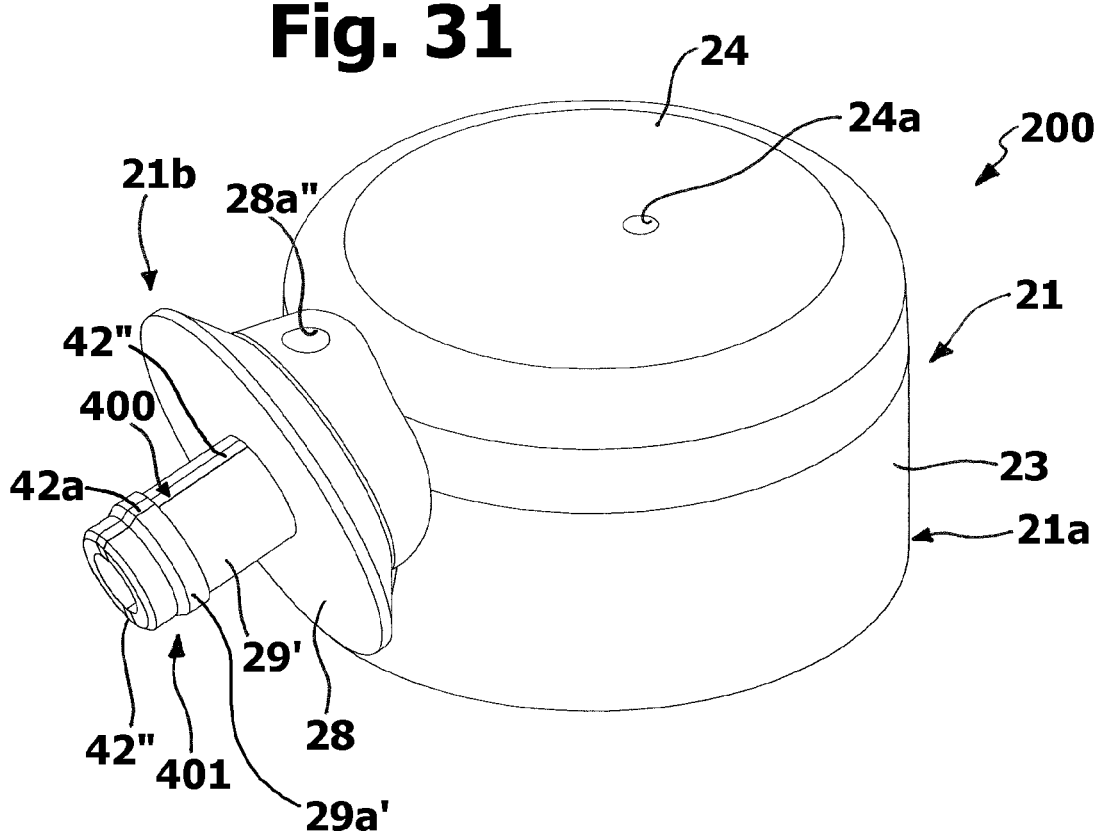
FIG. 31 is a schematic perspective view of a monitoring device according to a fourth embodiment of the invention.

FIGS. 31-35 illustrate the fourth embodiment of the invention according to which, similarly to the first embodiment, the monitoring device—indicated with 200 only in FIG. 31—has a casing body whose interconnection means are in part defined directly by the relative plastic material and in part defined by an insert made of electrically conductive material. The device 200 of FIG. 31 is designed for coupling with the electrically conductive body of a valve of the type substantially similar to that indicated with 2' in FIG. 14. In FIGS. 31-35 the same reference numbers of FIGS. 1-30 are used for indicating elements technically equivalent to those described previously.

The device 200 has a casing designed similar to that described with reference to the previous embodiments, and thus including the main body 21 and a cover, which are mutually coupled to define a housing for a relative circuit; the cover and circuit are not represented in FIGS. 31-33, in that similar to those described previously.

Also in this embodiment, in the material constituting the portion 28, and thus in the interconnection portion 21b, is partly integrated in an insert made of electrically conductive material, particularly a metal, indicated in its entirety with 400; the material of the part 28 also defines, together with the insert 400, a substantially cylindrical shape coupling, indicated in its entirety with 401.

The insert 400, represented in FIGS. 34 and 35, is substantially flat-shaped and it may be obtained through blanking from a metal strip, without requiring folding. As observable in FIGS. 34-35, the insert 400 comprises a solid intermediate portion 41, from which two substantially parallel appendages 42"—provided with respective hooking elements or teeth 42a, preferably including an inclined plane—branch. A terminal 44 branches from the intermediate portion 41, from the opposite side with respect to the appendages 42".

Figure 32:
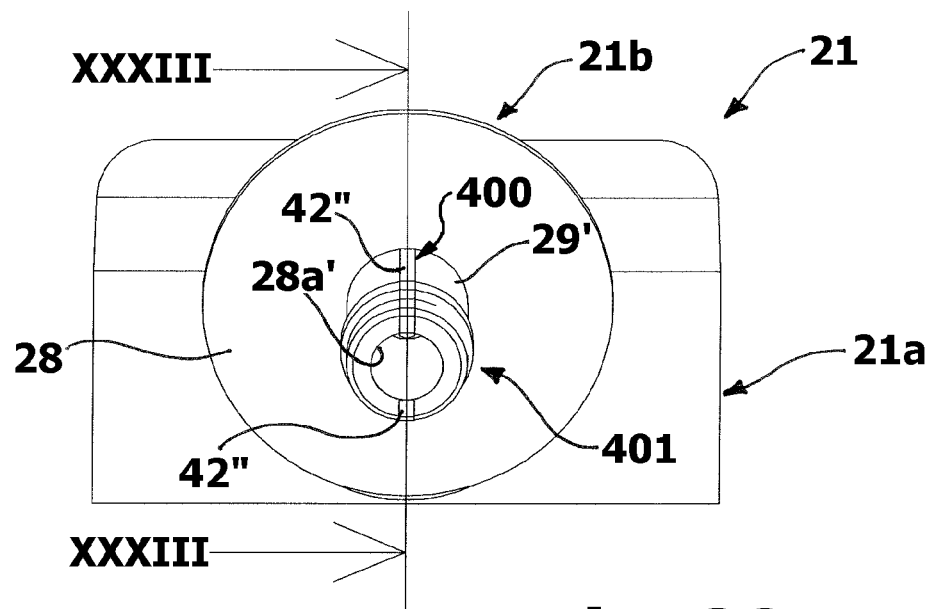
FIG. 32 is a front elevational schematic view of a part of the casing of the device of FIG. 31.

As observable for example in FIGS. 31 and 32, the plastic part of the cylindrical coupling 401 is essentially constituted by two semi-cylindrical walls, only one of which is indicated with 29', between which the two appendages 42" of the insert 400 are inserted. These two semi-cylindrical walls 29' are provided with respective hooking elements or teeth 29a; in positions aligned with those of the hooking elements 42a of the appendages 42" of the insert 400: thus, as evincible, an annular hooking relief is generally defined outside the coupling 401.

Figure 14:
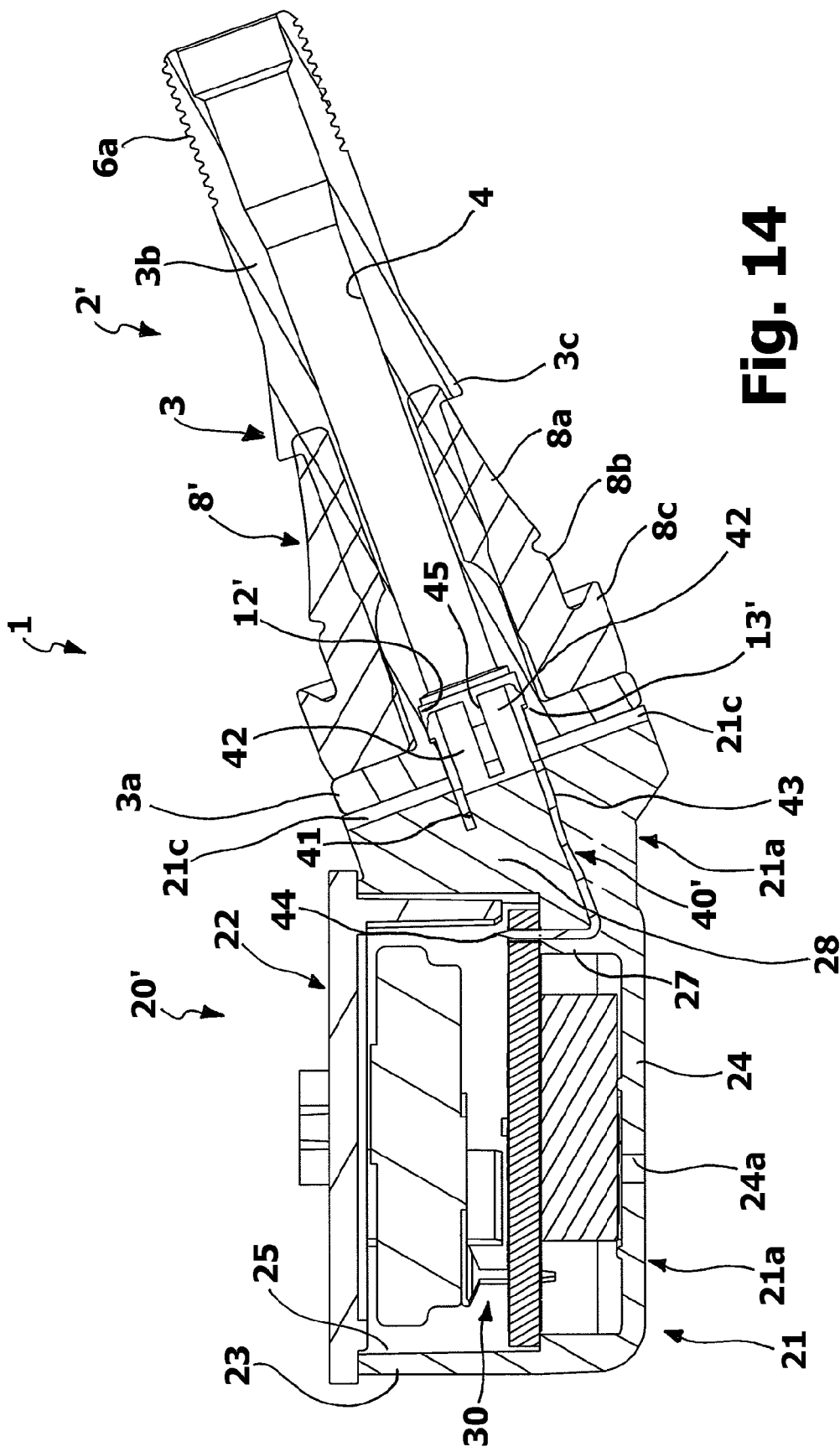
FIG. 14 is a section according to line XIV-XIV of FIG. 13.
Figure 15:
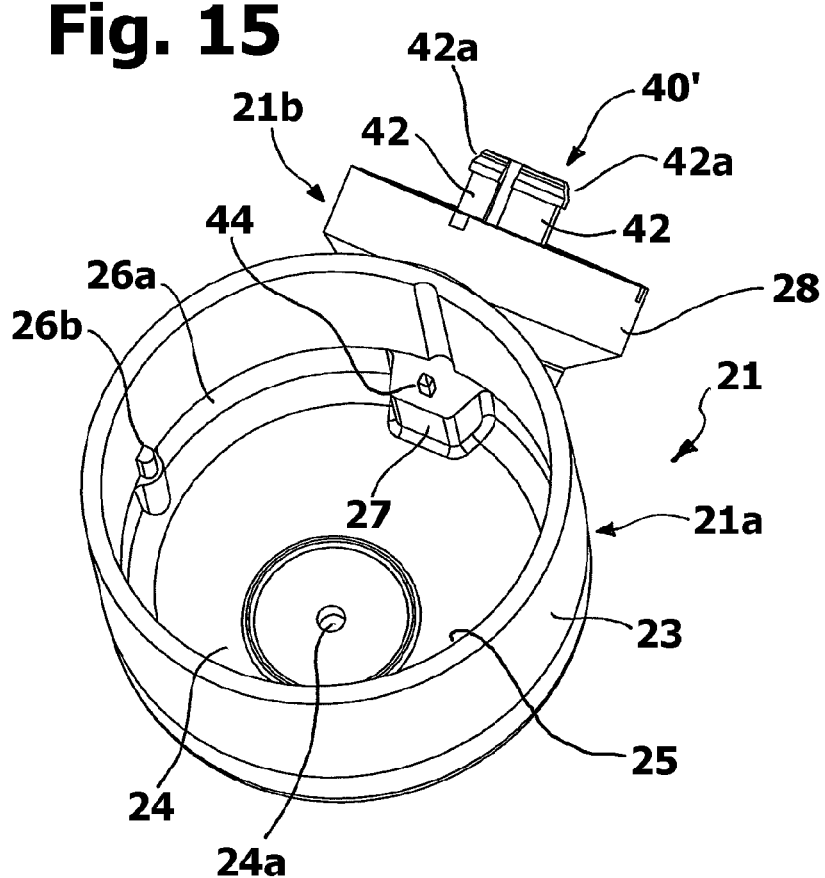
FIGS. 15, 16 and 17 are perspective views, from different angles, of a part of the casing of the device of FIG. 13.
Figure 16:
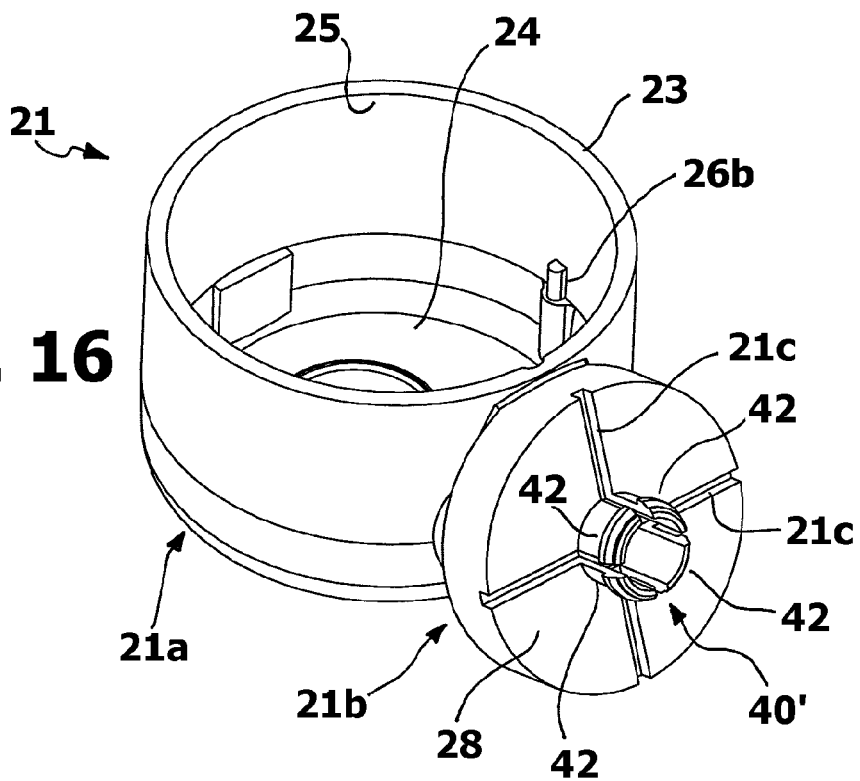
Figure 17:
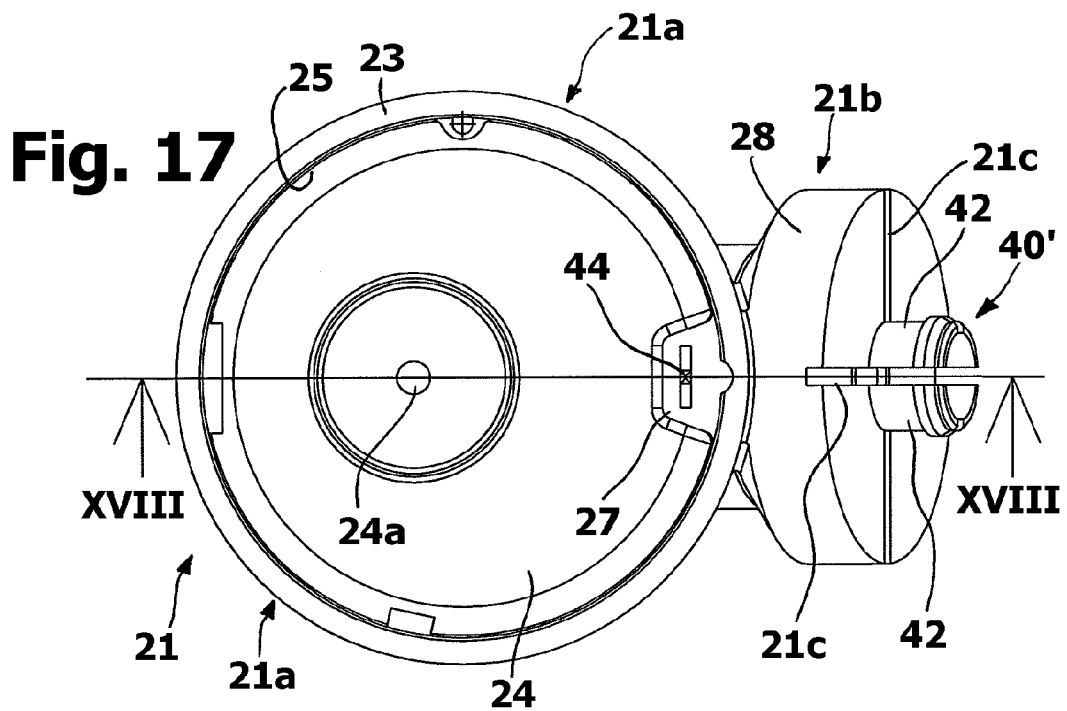
Figure 18:
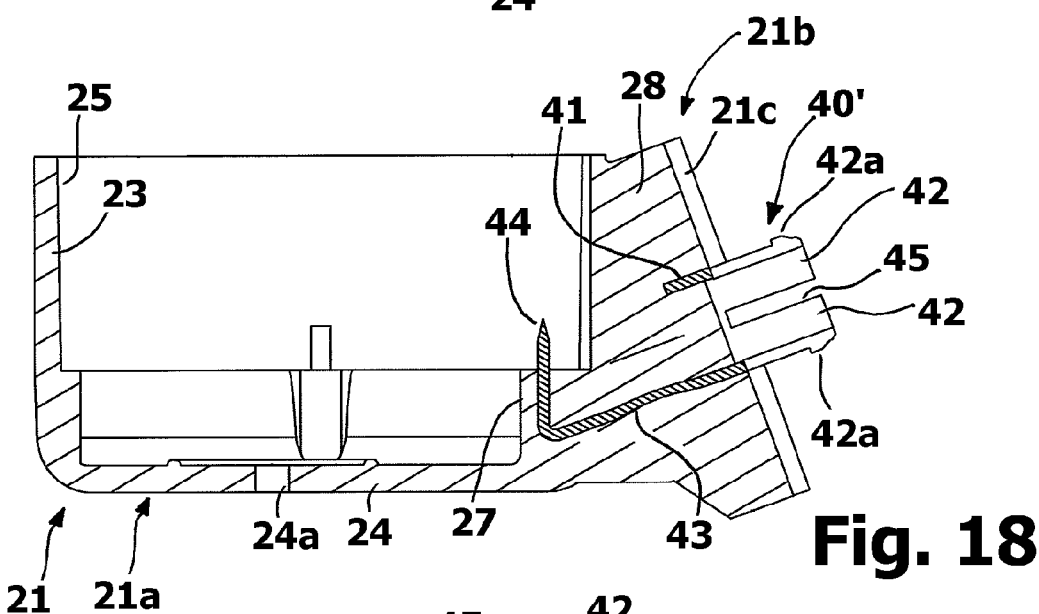
FIG. 18 is a section according to line XVIII-XVIII of FIG. 17.

In this embodiment, the coupling 401, internally hollow, also provides the first section of channel, indicated with 28a', designed to be placed in fluid communication with the inner conduit of the metal body of a valve, such as for example the inner conduit 4 of the body 3 of the valve 2' of FIG. 14. This first channel section 28a' is in fluid communication with a second channel section, indicated with 28a", defined in the body portion 28 of the casing body 21 and opening outside the latter, as observable for example in FIGS. 31 and 33.

As observable, also in this embodiment the insert 400 is partly embedded in the material constituting the casing body 21, in such a manner that the appendages 42" face or project at least partly—in the coupling 401—from the material constituting the portion 28 and at least the end zone of the terminal 44—as observable for example in FIG. 33—projects from the material constituting the formation 27 of the cavity 25. The moulding of the casing body 21 on the insert 400 is performed using equipment (for example comprising a mould with at least one mobile carriage) suitable to allow that the channel section 28a' is in communication with the channel section 28a". In a practical embodiment, for example, the channel section 28a" is made with at least one end zone, in the body 21, including two channel portions which develop parallel with the intermediate zone 41 of the insert 400 (or such part 41 divides said end zone into said two portions), then connecting to the section 28a'.

The type of mounting of the circuit in the casing body 21 of the device 200 according to the fourth embodiment is made through methods similar to those described previously with reference to the previous embodiments. The mechanical, electrical and fluidic interconnection of the device 200 to the valve occurs through methods substantially similar to those described previously with reference to the embodiment of FIGS. 13-22. For such purpose, for example with reference to the valve 2' of FIG. 14, it is enough to push the device 200 in such a manner that the cylindrical coupling 401 is inserted inwards the axial conduit 4 of the body 3, i.e. it is hooked with the seat 12' of the base part 3a. The circumference defined by the teeth 29a' and 42a' of the coupling 401 is slightly larger with respect to the circumference of the end of the conduit 4; however, due to the presence of the inclined planes of the teeth 42a' and 29a', the possibility of slight elastic yielding of the semi-cylindrical walls 29' and the elasticity—though low—of the appendages 42", in the step of pushing the coupling 401 may be fitted into the conduit 4, in such a manner to subsequently allow the engagement of the abovementioned teeth with the step or undercut defined by the cylindrical widening 12' of the conduit. Thus, the device 200 is mechanically hooked to the conductive body of the valve, with the insert 400 also allowing establishing an electric continuity between the body and the circuit. Furthermore, following such coupling, the inner conduit of the valve is in fluid communication with the channel 28a'-28a" formed in the interconnection portion 21b.

It is observed that, in this embodiment, the interconnection part 21b, and more precisely the cylindrical coupling 401 thereof, does not provide for hooking parts specifically configured to be elastically flexible, like in the first two embodiments. However, if required, the device 200 may however be separated by a metal body valve, exploiting the aforementioned possibility of slight elastic yielding of the semi-cylindrical walls 19' and appendages 42".

In any case, in order to improve the coupling elasticity (and possible decoupling), the semi-cylindrical walls 29' could also be provided with several sections, i.e. with empty spaces or notches interposed.

FIGS. 36-40 illustrate a fifth embodiment of a monitoring device according to the invention designed for coupling with the electrically conductive body of a valve substantially of the type indicated with 2' in FIG. 14.

Figure 36:
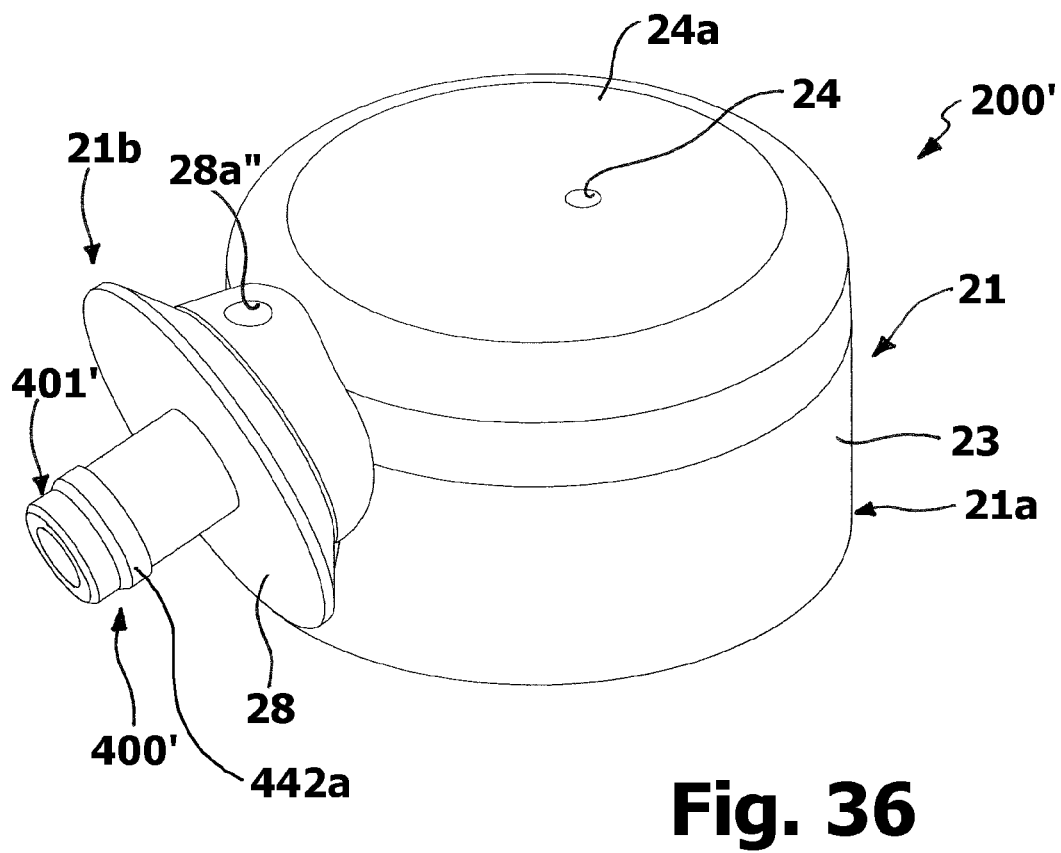
FIG. 36 is a schematic perspective view of a monitoring device according to a fifth embodiment of the invention.
Figure 37:
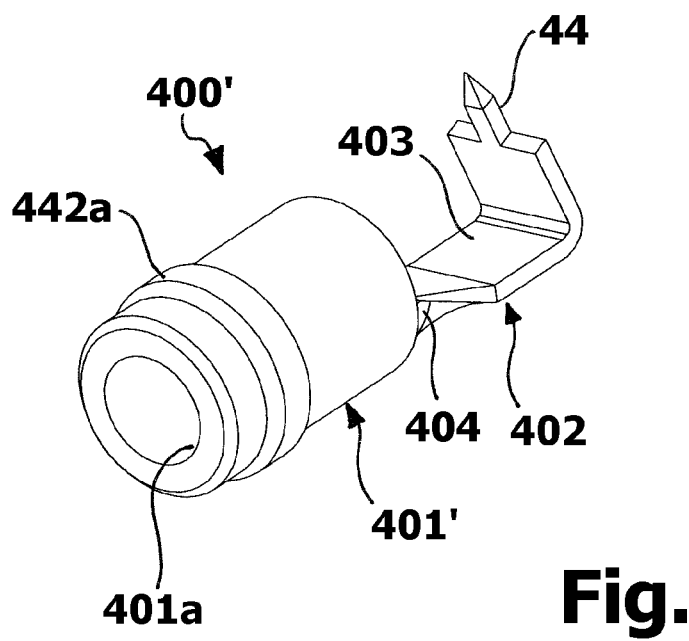
FIG. 37 is a schematic perspective view of the insert for a part of the casing of the device of FIG. 36.
Figure 38:
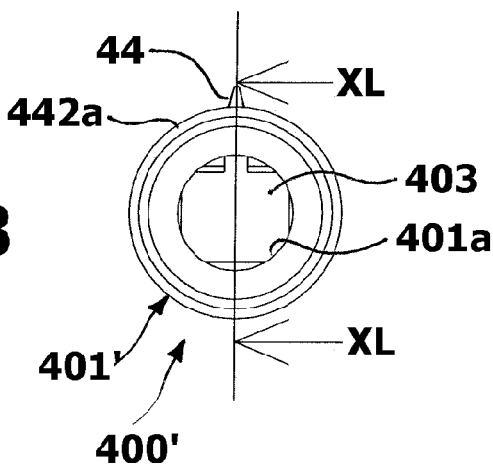
FIGS. 38 and 39 are two schematic views, in front and side elevation, respectively, of the insert of FIG. 37.
Figure 39:
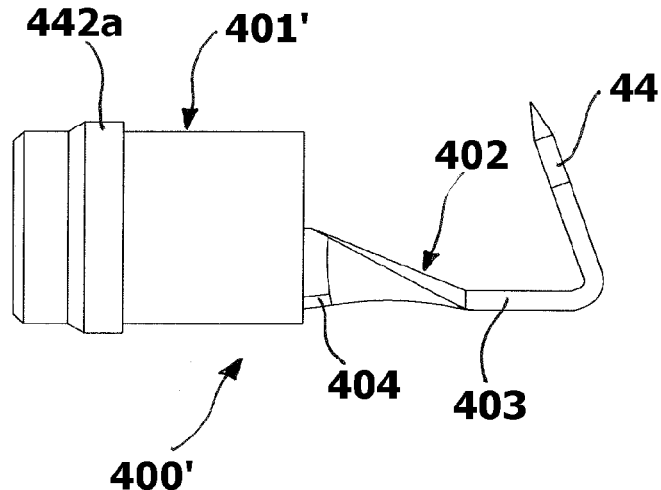
Figure 40:
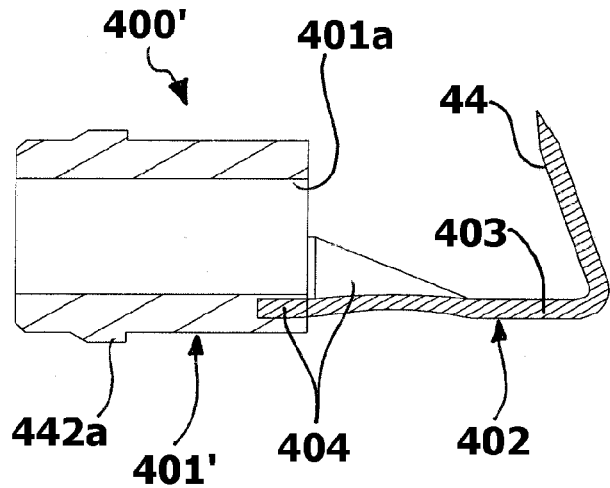
FIG. 40 is a section according to line XL-XL of FIG. 38.

As observable in FIG. 36, the device, indicated with 200' in its entirety, comprises a casing body 21 having a shape generally similar to that of the body 21 of FIGS. 31-33. In this embodiment, an insert, indicated in its entirety with 400', is provided for made at least partly using an electrically conductive plastic or synthetic material; particularly a mouldable material.

In particular, as observable in FIGS. 37-40, in the exemplified embodiment, the insert 400' includes a first substantially cylindrical-shaped part, indicated with 401', which has an axial cavity 401a and which includes on the external surface thereof an annular hooking relief 442a. In the example, the part 401' is thus substantially shaped similar to the coupling indicated with 401 in FIGS. 31-33, but entirely obtained using synthetic or mouldable material of the electrically conductive type. The insert 400' further comprises a second part, indicated in its entirety with 402, which is also made of electrically conductive material, particularly a metal, such as copper or brass. This part 402, which for example may be obtained through the blanking and folding of a metal strip, including an intermediate portion 403 from whose two ends a connection portion 404 and a terminal 44 branch.

In an embodiment, the part 401' is moulded in such a manner to define a seat or cavity in which the portion 403 of the second part 402 is at least partly driven, with mechanical interference. In another embodiment instead, the part 401' is over-moulded or co-moulded directly on the second part 402. Such moulding operation may for example be obtained through injection systems, thermoforming or vulcanisation of materials, such as thermoplastic, thermosetting or elastomer material, or other equivalent materials suitable for the purpose.

The part 401' may be obtained using substantially insulating thermoplastic material comprising, or filled with an electrically conductive material or substance, such as for example fibres or powders of carbon, graphite, metal material, conductive synthetic substances, etcetera. For such purpose, the use of material filled with carbon fibre is particularly advantageous. In combination, or alternatively, the synthetic material used for forming the part 401' may be of the type inherently conductive from an electric point of view, due to the molecular structure thereof, without requiring to be filled or added with other further materials or substances; this is for example the behaviour of a some particular polymers called "inherently conductive" from an electrical point of view. Unless otherwise specified, and in the attached claims, the term "electrically conductive synthetic material" shall thus be meant as indicating a plastic or synthetic material added with a further electrically conductive material or substance, or an inherently electrically conductive plastic or synthetic material.

Also the part 402 could be possibly made of synthetic or mouldable material of the electrically conductive type, coupled to the part 401' or made integral therewith.

Regardless of the type of coupling between the two parts 401' and 402 (driving or over-moulding), even in this solution the insert 400' is partly embedded, in particular through over-moulding or co-moulding, into the material constituting the casing body 21. Following the moulding of the casing body 21, the part 401' of the insert 400' projects from the material 28 constituting the relative interconnection portion 21b and at least the end zone of the terminal 44 (similarly to the case of FIG. 33) projects in the cavity of the housing portion 21. Thus, as evincible, the casing body 21 assumes—in its entirety—a shape substantially similar to that of the part 21 of FIGS. 31 and 32. Obviously, even in this embodiment, the casing body 21 is moulded in such a manner to have a channel 28" in fluid communication with the axial cavity 401a of the part 401'.

The type of mounting of the circuit in the casing body 21 of the device 200', as well as the mechanical, electrical and fluidic interconnection of the device 200' to the valve occurs through methods substantially similar to those described previously with reference to the fourth embodiment.

It shall be observed that, also in this embodiment, the presence of the metal part 402 allows reinforcing the interface region of the casing body, as well as obtaining the advantages described previously in relation to other embodiments. Likewise, it shall be observed that the solution of providing for the insert in two parts, one made of electrically conductive synthetic material and the other made of metal, may also be used for constructing inserts having a different shape with respect to those of FIGS. 37-40, such as for example the insert of the first four embodiments illustrated.

It shall be observed that the solution of providing for the insert, entirely or partly, made of electrically conductive plastic or material, can also be used in the case of other embodiments of the invention described, such as the embodiments of FIGS. 1-34.

It is clear that a man skilled in the art may subject the device described by way of example to numerous variants, without departing from the scope of protection of the invention as defined in the attached claims.

For example, in a possible embodiment—not represented but conceptually similar to that of FIGS. 23-30—an insert having a shape generally similar to that of the insert described previously with 40", in which the respective base part (41) is provided with a through hole (41*a*) having an internal thread or female thread, is provided for. In this case, the base part (3*a*) of the body (3) of the valve has a projecting cylindrical portion, traversed by a respective terminal portion of the inner conduit (4) of the valve, and this cylindrical projecting portion is provided with an external thread, for thread coupling with the abovementioned female thread. Also in such embodiment, a casing body (21) of the device is preferably over-moulded to the insert, in such a manner that the over-moulded material surrounds at least partly the insert at the external part thereof; in this embodiment, preferably, the base part of the insert has a non-cylindrical external profile, or however configured (for example with projecting lateral appendages embedded in the plastic material) in such a manner to prevent the risk of mutual rotation between the insert and the casing body, particularly during the screwing of the device onto the valve.

The invention claimed is:

1. A device for monitoring a vehicle wheel, configured for detecting and transmitting, by a wireless connection, information relating to at least one characteristic quantity of the status of the wheel, the device having a casing housing a circuit adapted to transmit said information, the casing being designed for coupling to an end portion of body made of electrically conductive material of a tyre valve of the wheel, wherein, in an installed condition of the valve and of the device, the end portion of the electrically conductive body of the valve extends at least partly within a tyre mounting channel and the casing of the device is secured to said end portion,
wherein the casing includes a casing body integrating interconnection element prearranged to obtain both an electric connection of the circuit to the end portion of the electrically conductive body of the valve and a mechanical coupling of the casing to the end portion of the electrically conductive body of the valve;
wherein the casing body is made of electrically insulating material and the interconnection element comprises an electrically conducted insert, integrated in the casing body and configured to obtain at least in part the said mechanical coupling and the said electrical connection;
wherein the electrically insulating material is a mouldable plastic material and the casing body is over-moulded to or co-moulded with the insert such that the insert is embedded within electrically insulating material of the casing body,
wherein the insert defines mechanical coupling element and electrical connection element protruding from the electrically insulating material of the casing body in which the insert is embedded; and
wherein the mechanical coupling element is configured to be at least hooked or push-coupled within a hollow cavity, or seat extending inside the end portion of the electrically conductive body of the valve.

2. The device according to claim 1, wherein the mechanical coupling element comprises one of
one or more hooking elements which are elastically deformable for the purposes of coupling within said hollow cavity or seat extending, inside the end portion of the electrically conductive body of the valve,
a joint adapted to be coupled by push-coupling within said hollow cavity or seat extending inside the end portion of the electrically conductive body of the valve.

3. The device according to claim 2, wherein the interconnection element comprises one or more further hooking elements defined by electrically insulating material of the casing body, the further hooking elements being elastically deformable for the purposes of coupling within said hollow cavity or seat extending inside the end portion of the electrically conductive body of the valve.

4. The device according to claim 1, wherein the electrical connection element includes at least one portion of the insert having a respective end protruding from the electrically insulating material, within a cavity of the casing in which the circuit is housed, said end being configured for electrical coupling with the circuit.

5. The device according to claim 1, wherein the insert has a body portion traversed by a passage.

6. The device according to claim 1, wherein the insert is prearranged to obtain at least in part a fluidic connection between the casing body and an inner conduit of the valve opening at the end portion of the electrically conductive body of the valve.

7. A device for monitoring a vehicle wheel, configured for detecting and
transmitting, by a wireless connection, information relating to at least one characteristic quantity of the status of the wheel, the device having a casing housing a circuit adapted to transmit said information, the casing being designed for coupling to an end portion of body made of electrically conductive material of a tyre valve of the wheel, wherein, in an installed condition of the valve and of the device, the end portion of the electrically conductive body of the valve extends at least partly within a tyre mounting channel and the casing of the device is secured to said end portion,
wherein the casing includes a casing body integrating interconnection element prearranged to obtain both an electric connection of the circuit to the end portion of the electrically conductive body of the valve and a mechanical coupling of the casing to the end portion of the electrically conductive body of the valve;
wherein the casing body is made of electrically insulating material and the interconnection element comprises an electrically conductive insert, integrated in the casing body and configured to obtain at least in part the said mechanical coupling and the said electrical connection;
wherein the electrically insulating material is a mouldable plastic material and the casing body is over-moulded to, or co-moulded with, the insert, such that the insert is partially embedded within electrically insulating material of the casing body, wherein the insert defines mechanical coupling element and electrical connection element protruding from the electrically insulating material of the casing body in which the insert is partially embedded; and wherein the mechanical coupling element is configured to be at least partially screwed within a threaded seat extending axially inside the end portion of the electrically conductive body of the valve.

8. device according to claim 6, wherein the insert has a body portion traversed by a passage, and a region of the casing body from which the mechanical coupling element projects is provided with at least one conduit or surface notch designed to be placed in fluid communication with an inner conduit of the valve, said at least one conduit or surface notch extending, in a transverse direction relative to said inner conduit of the valve.

9. The device according to claim 1, wherein the device comprises at least one of the insert has at least one hooking element having a cross-section circumference arc-shaped and/or a plurality of hooking elements arranged according to a circumference;

the insert is at least partly formed of an electrically conductive synthetic material, in particular a mouldable synthetic material;

at least one portion of the insert defines, together with plastic material of the casing body, a cylindrical joint designed for coupling with the electrically conductive body of the valve.

10. Use of a monitoring device according to claim 1 in combination with a tyre valve having an electrically conductive body, wherein, in an installed condition of the valve and of the device, an end portion of the electrically conductive body of the valve extends at least partly within a tyre mounting channel and the casing of the device is secured at said hollow cavity or seat extending portion of the electrically conductive body of the valve through said mechanical coupling element.

11. A tyre valve for use in combination with a monitoring device according to claim 1, the valve comprising an electrically conductive body with an end portion which, in an installed condition of the valve and of the device, extends at least partly within a tyre mounting channel, inside the end portion of the electrically conductive body a hollow cavity or seat being defined, for mechanical and electrical coupling with at least one of said casing body and the said insert via said interconnection element.

12. The valve according to claim 11, wherein inside said end portion of the electrically conductive body a hooking seat is defined for one or more elastically deformable hooking elements belonging to at least one of said insert and said casing body, or the electrically conductive body has an inner conduit opening at a proximal end of said end portion and defining a hooking seat for one or more hooking elements belonging to at least one of said insert and said casing body.

13. The device according to claim 1, comprising a tyre valve having an electrically conductive body, wherein, in an installed condition, an end portion of the electrically conductive body of the valve extends at least partly within a tyre mounting channel and the casing of the device is secured to said end portion of the electrically conductive body of the valve through said casing body, and wherein a hollow cavity or seat extends inside said end portion of the electrically conductive body of the valve.

14. The device according to claim 1, comprising a tyre valve having an electrically conductive body with an end portion which, in an installed condition, extends at least partly within a tyre mounting channel, the end portion of the electrically conductive body being configured for mechanical and electrical coupling with at least one of said casing body and the said insert, wherein said hollow cavity or seat extends inside said end portion of the electrically conductive body of the valve.

15. The device according to claim 14, wherein inside said end portion of the electrically conductive body a hooking seat is defined for one or more elastically deformable hooking elements belonging to said casing body, the hooking seat comprising a blind cavity of said end portion of the electrically conductive body of the valve.

16. The device according to claim 14, wherein the electrically conductive body has an inner conduit opening at said end portion and defining a hooking seat for at least one hooking element belonging to said casing body, said hooking seat including an undercut or step of said inner conduit.

17. The device according to claim 7, wherein the insert has a cylindrical body portion traversed by a passage;

within said passage of the cylindrical body portion of the insert part of the electrically insulating material of the casing body is present;

said cylindrical body portion of the insert is externally provided with a thread to be screwed within said threaded cavity or seat extending inside the end portion of the electrically conductive body of the valve, and the part of the electrically insulating material which is present within said passage of the cylindrical body portion of the insert is traversed by a channel designed to be placed in fluid communication with an inner conduit of the valve opening at the end portion of the electrically conductive body thereof.

18. A tyre valve for use in combination with a monitoring device according to claim 7, the valve comprising an electrically conductive body with an end portion which, in an installed condition of the valve and of the device, extends at least partly within a tyre mounting channel, inside the end portion of the electrically conductive body a threaded seat being defined, configured for mechanical and electrical coupling with at least one of said casing body and the said insert via said mechanical coupling element.

19. The valve according to claim 11, wherein the hooking seat comprises a blind cavity of said end portion of the electrically conductive body of the valve.

20. The valve according to claim 19, wherein the electrically conductive body has an axial inner conduit which branches into a plurality of radial conduits.

* * * * *